(12) United States Patent
Ekberg et al.

(10) Patent No.: US 7,313,120 B2
(45) Date of Patent: Dec. 25, 2007

(54) APPLICATION CONTROL IN PEER-TO-PEER AD-HOC COMMUNICATION NETWORKS

(75) Inventors: Jan-Erik Ekberg, Helsinki (FI); Pekka Lahtinen, Helsinki (FI)

(73) Assignee: Nokia Corporation, Espoo (FI)

( * ) Notice: Subject to any disclaimer, the term of this patent is extended or adjusted under 35 U.S.C. 154(b) by 206 days.

(21) Appl. No.: 10/662,469

(22) Filed: Sep. 16, 2003

(65) Prior Publication Data

US 2005/0058108 A1 Mar. 17, 2005

(51) Int. Cl.
*H04Q 7/24* (2006.01)
(52) U.S. Cl. ...................................... 370/338; 370/342
(58) Field of Classification Search ................ 370/338, 370/254, 255, 277, 278
See application file for complete search history.

(56) References Cited

U.S. PATENT DOCUMENTS

| | | | | |
|---|---|---|---|---|
| 5,251,251 A * | 10/1993 | Barber et al. | ............ | 379/88.23 |
| 5,736,940 A * | 4/1998 | Burgener | .................... | 340/994 |
| 5,819,039 A | 10/1998 | Morgaine | | |
| 6,112,103 A * | 8/2000 | Puthuff | ........................ | 455/557 |
| 6,198,941 B1 | 3/2001 | Aho et al. | | |
| 6,219,969 B1 | 4/2001 | Wynblatt et al. | | |
| 6,532,368 B1 * | 3/2003 | Hild et al. | .................. | 455/515 |
| 6,557,054 B2 * | 4/2003 | Reisman | ........................ | 710/33 |
| 6,591,266 B1 | 7/2003 | Li et al. | | |
| 6,601,093 B1 | 7/2003 | Peters | | |
| 6,631,269 B1 * | 10/2003 | Cave | ........................... | 455/450 |
| 6,633,757 B1 * | 10/2003 | Hermann et al. | ........ | 455/414.1 |
| 6,657,713 B2 | 12/2003 | Hansen | | |
| 6,721,787 B1 * | 4/2004 | Hiscock | ....................... | 709/217 |
| 6,738,766 B2 * | 5/2004 | Peng | .............................. | 707/6 |
| 6,757,713 B1 * | 6/2004 | Ogilvie et al. | .............. | 709/206 |

(Continued)

FOREIGN PATENT DOCUMENTS

EP 1246487 A2 2/2002

(Continued)

OTHER PUBLICATIONS

"All About ISOC", web page [online], Internet Society, 2002 [2 pages retrieved on Oct. 23, 2003]. Retrieved from the Internet: <http://www.isoc.org/isoc/>.

(Continued)

*Primary Examiner*—Chi Pham
*Assistant Examiner*—Thai Hoang
(74) *Attorney, Agent, or Firm*—Morgan & Finnegan, L.L.P.

(57) ABSTRACT

A computer system, method, and computer program product for controlling access to an application program in a wireless device connected to an ad-hoc communications network. The method comprises sending an inquiry message to the network, receiving a response, choosing a selected application, and examining control parameters associated with the selected application. The control parameters dictate a behavior of the selected application such as allowing or refusing communication with the selected application. When a nearby wireless device includes a matching application, connecting the selected application and the matching application further comprises sending a connection request, receiving connection response, launching the selected application, and sending a service request. When the selected application closes, the method further comprises erasing the selected application. To choose the selected application, the method further comprises retrieving an entry from a distributed application directory or selecting the application based on a priority assigned to the entry.

63 Claims, 10 Drawing Sheets

U.S. PATENT DOCUMENTS

| | | |
|---|---|---|
| 6,757,715 B1 | 6/2004 | Philyaw |
| 6,765,474 B2 | 7/2004 | Eaton et al. |
| 6,892,230 B1* | 5/2005 | Gu et al. .................... 709/220 |
| 6,909,721 B2 | 6/2005 | Ekberg et al. |
| 6,981,210 B2 | 12/2005 | Peters et al. |
| 7,028,032 B1 | 4/2006 | Diedrich et al. |
| 7,158,176 B2* | 1/2007 | Tokkonen et al. ..... 348/231.99 |
| 2002/0012329 A1 | 1/2002 | Atkinson et al. |
| 2002/0039367 A1 | 4/2002 | Seppala et al. |
| 2002/0044549 A1 | 4/2002 | Johansson et al. |
| 2002/0073204 A1* | 6/2002 | Dutta et al. ................ 709/227 |
| 2002/0120750 A1 | 8/2002 | Nidd .......................... 709/227 |
| 2002/0123360 A1 | 9/2002 | Vikman et al. |
| 2002/0124046 A1* | 9/2002 | Fischer et al. .............. 709/201 |
| 2002/0129170 A1* | 9/2002 | Moore et al. ............... 709/249 |
| 2002/0152299 A1 | 10/2002 | Traversat et al. |
| 2002/0160758 A1 | 10/2002 | Pradhan et al. |
| 2002/0160793 A1 | 10/2002 | Pradhan et al. |
| 2002/0178215 A1 | 11/2002 | Laksono et al. |
| 2002/0188657 A1* | 12/2002 | Traversat et al. ........... 709/206 |
| 2003/0013483 A1 | 1/2003 | Ausems et al. |
| 2003/0037033 A1 | 2/2003 | Nyman et al. |
| 2003/0041141 A1 | 2/2003 | Abdelaziz et al. |
| 2003/0054806 A1* | 3/2003 | Ho et al. .................... 455/414 |
| 2003/0061364 A1* | 3/2003 | Banerjee et al. ............ 709/229 |
| 2003/0069016 A1 | 4/2003 | Bahl et al. |
| 2003/0078062 A1 | 4/2003 | Burr |
| 2003/0079003 A1* | 4/2003 | Burr ........................... 709/221 |
| 2003/0110218 A1 | 6/2003 | Stanley |
| 2003/0115415 A1* | 6/2003 | Want et al. ................. 711/115 |
| 2003/0131059 A1 | 7/2003 | Brown et al. |
| 2003/0207683 A1 | 11/2003 | Lempio et al. |
| 2003/0208522 A1 | 11/2003 | McDonnell et al. |
| 2003/0228842 A1 | 12/2003 | Heinonen et al. |
| 2004/0002385 A1* | 1/2004 | Nguyen ........................ 463/42 |
| 2004/0009750 A1 | 1/2004 | Beros et al. |
| 2004/0015403 A1* | 1/2004 | Moskowitz et al. .......... 705/26 |
| 2004/0030743 A1 | 2/2004 | Hugly et al. |
| 2004/0043770 A1 | 3/2004 | Amit et al. |
| 2004/0063498 A1* | 4/2004 | Oakes et al. .................. 463/42 |
| 2004/0063980 A1 | 4/2004 | Raths et al. |
| 2004/0064568 A1 | 4/2004 | Arora et al. |
| 2004/0075675 A1 | 4/2004 | Raivisto et al. |
| 2004/0087274 A1 | 5/2004 | Ekberg et al. |
| 2004/0114557 A1* | 6/2004 | Bryan et al. ................. 370/338 |
| 2004/0171378 A1 | 9/2004 | Rautila |
| 2004/0224706 A1 | 11/2004 | Lorello et al. |
| 2004/0225712 A1 | 11/2004 | Tajima et al. |
| 2005/0058109 A1 | 3/2005 | Ekberg et al. |
| 2005/0059376 A1 | 3/2005 | Sovio et al. |
| 2005/0059379 A1 | 3/2005 | Sovio et al. |
| 2005/0088980 A1 | 4/2005 | Olkkonen et al. |
| 2005/0114756 A1 | 5/2005 | Lehikoinen et al. |
| 2005/0185660 A1 | 8/2005 | Ekberg et al. |
| 2005/0193106 A1* | 9/2005 | Desai et al. ................. 709/223 |
| 2005/0208892 A1 | 9/2005 | Kotola |
| 2005/0239494 A1 | 10/2005 | Klassen et al. |
| 2006/0058011 A1 | 3/2006 | Vanska et al. |
| 2006/0199533 A1 | 9/2006 | Zilliacus et al. |
| 2006/0258338 A1 | 11/2006 | Markki et al. |
| 2006/0268896 A1 | 11/2006 | Kotola et al. |

FOREIGN PATENT DOCUMENTS

| | | |
|---|---|---|
| EP | 1207707 A1 | 5/2002 |
| EP | 1242986 B1 | 9/2002 |
| EP | 123540 A2 | 10/2002 |
| EP | 1246487 A3 | 10/2002 |
| EP | 1392023 A2 | 2/2004 |
| EP | 1392023 A3 | 2/2004 |
| EP | 1505811 A1 | 2/2005 |
| GB | 2410153 A | 7/2005 |
| JP | 2003/016347 A1 | 1/2003 |
| WO | WO 99/41876 | 8/1999 |
| WO | 00/72506 A1 | 11/2000 |
| WO | WO 01/31960 A1 | 5/2001 |
| WO | WO 01/45319 | 6/2001 |
| WO | WO 01/95592 A1 | 12/2001 |
| WO | WO 02/071285 A1 | 9/2002 |
| WO | WO 03/034664 | 4/2003 |
| WO | WO 03/055150 A2 | 7/2003 |
| WO | WO 03/055238 A1 | 7/2003 |
| WO | WO 2004/038541 A2 | 5/2004 |
| WO | WO 2004/038541 A3 | 5/2004 |
| WO | WO 2004/091143 A2 | 10/2004 |
| WO | WO 2005/038696 A1 | 4/2005 |
| WO | WO 2006/092688 A2 | 9/2006 |

OTHER PUBLICATIONS

"All About ISOC: Conferences—NDSS", web page [online], Internet Society, 2002 [1 page retrieved on Oct. 23, 2003]. Retrieved from the Internet: <http://www.isoc.org/isoc/conferences/ndss/>.

"Internet Society (ISOC): All About The Internet", web page [online], Internet Society, 2002 [1 page retrieved on Oct. 23, 2003]. Retrieved from the Internet: <http://www.isoc.org/isoc/conferences/ndss/02/>.

"NDSS Conference Proceedings: 2002", web page [online], Internet Society [2 pages retrieved on Oct. 23, 2003]. Retrieved from the Internet: <http://www.isoc.org/isoc/conferences/ndss/02/proceedings/>.

Balfanz et al. "Talking to Strangers: Authentication in Ad-Hoc Wireless Networks", Xerox Palo Alto Research Center, (Date Unknown), 13 pages.

Kammer et al., "Bluetooth Application Developer's Guide: The Short Range Interconnect Solution", Syngress Publishing, Inc., 2002, pp. 1-68.

U.S. Appl. No. 10/284,135, filed Oct. 31, 2002, Ekberg et al.
U.S. Appl. No. 10/662,407, filed Sep. 16, 2003, Ekberg et al.
U.S. Appl. No. 10/662,470, filed Sep. 16, 2003, Ekberg.
U.S. Appl. No. 10/784,215, filed Feb. 24, 2004, Sovio et al.

"Assigned Numbers", article [online], Bluetooth SIG, Inc., 1999-2001 [2 pages retrieved on Sep. 3, 2003]. Retrieved from the Internet: <http://www.bluetoothsig.org/assigned-numbers/>.

"Assigned Numbers—Bluetooth Baseband", article [online], Bluetooth SIG., Inc., 1999-2001 [7 pages retrieved on Sep. 3, 2003]. Retrieved from the Internet <http://www.bluetoothsig.org/assigned-numbers/baseband.htm>.

"Assigned Numbers—Link Manager Protocol (LMP)", article [online], Bluetooth SIG, Inc., 1999-2001 [1 page retrieved on Sep. 3, 2003]. Retrieved from the Internet <http://www.bluetoothsig.org/assigned-numbers/lmp.htm>.

"Assigned Numbers—Logical Link Control and Adaptation Protocol (L2CAP)", article [online], Bluetooth SIG., Inc., 1999-2001 [2 pages retrieved on Sep. 3, 2003]. Retrieved from the Internet <http://www.bluetoothsig.org/assigned-numbers/l2cap.htm>.

"Assigned Numbers—Service Discovery Protocol (SDP)", article [online], Bluetooth SIG., Inc. 1999-2001 [11 pages retrieved on Sep. 3, 2003]. Retrieved from the Internet <http://www.bluetoothsig.org/assigned-numbers/sdp.htm>.

"Assigned Numbers—Service Discovery Protocol (SDP)", article [online], Bluetooth SIG., Inc., 1999-2001 [5 pages retrieved on Sep. 3, 2003]. Retrieved from the Internet <http://www.bluetoothsig.org/assigned-numbers/host.htm>.

"Assigned Numbers—Company Identifiers", article [online], Bluetooth SIG., Inc. 1999-2001 [3 pages retrieved on Sep. 3, 2003]. Retrieved from the Internet <http://www.bluetoothsig.org/assigned-numbers/company.htm>.

"Assigned Numbers—References", article [online], Bluetooth SIG., Inc. 1999-2001 [6 pages retrieved on Sep. 3, 2003]. Retrieved from the Internet <http://www.bluetoothsig.org/assigned-numbers/tail.htm>.

Bobba et al., Bootstrapping Security Associations for Routing in Mobile Ad-Hoc Workstations, IEEE Global Telecommunications Conference Proceedings; San Francisco, CA Dec. 1-5, 2003, IEEE Global Telecommunications Conference Proceedings, NY, NY: IEEE US, vol. 7 of 7; Dec. 1, 2003; pp. 1511-1513; GLOBCOM 2003; ISBN: 0-7803-7974-8.

"Windows NT Workstation"; Nov. 2, 2003; pp. 1-14; XP002323988; Retrieved from Internet: www.meetsoon.com/sid3.html; Apr. 11, 2005.

Kolsi et al.; "MIDP 2.0 Security Enhancements" System Sciences, 2004; Proceedings of the 37 Annual Hawaii International Conference on Jan. 5-8, 2004, Piscataway, NJ; IEEE, JAn. 5, 2004, pp. 287-294, XP010682881; ISBN: 0-7695-2056-1.

PCT International Search Report for PCT/Ib2006/001347, Oct. 24, 2006, 4 pages.

* cited by examiner

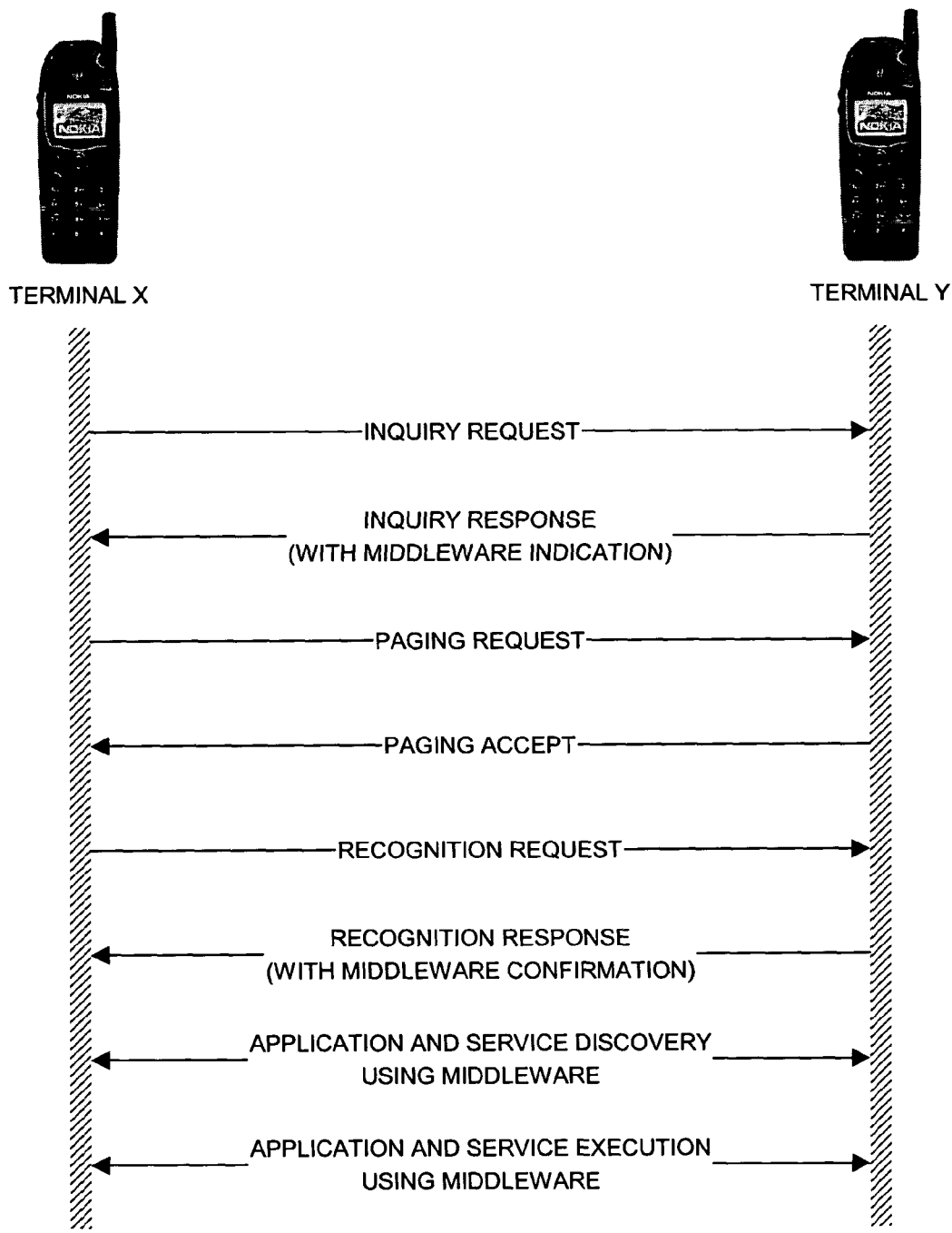

APPLICATION CONTROL IN PEER-TO-PEER AD-HOC COMMUNICATION NETWORKS

CROSS-REFERENCE TO RELATED APPLICATIONS

This application for letters patent is related to and incorporates by reference U.S. patent application Ser. No. 10/284,135, titled "DEVICE DETECTION AND SERVICE DISCOVERY SYSTEM AND METHOD FOR A MOBILE AD HOC COMMUNICATIONS NETWORK", and filed in the United States Patent and Trademark Office on Oct. 31, 2002. This application for letters patent is also related to and incorporates by reference United States continuation-in-part patent application Ser. No. 10/662,407, titled "DEVICE DETECTION AND SERVICE DISCOVERY SYSTEM AND METHOD FOR A MOBILE AD HOC COMMUNICATIONS NETWORK", and filed in the United States Patent and Trademark Office on Sep. 16, 2003. This application for letters patent is also related to and incorporates by reference U.S. patent application Ser. No. 10/662,470, titled "MECHANISM FOR IMPROVING CONNECTION CONTROL IN PEER-TO-PEER AD-HOC NETWORKS", and filed in the United States Patent and Trademark Office on Sep. 16, 2003. The assignee is the same in this patent application and the related patent applications.

FIELD OF THE INVENTION

The present invention relates, in general, to communication between devices connected to a wireless communication network. In particular, the present invention is a system and method for controlling access to an application program in a wireless device connected to a spontaneous and instant (ad-hoc) communications network.

BACKGROUND OF THE INVENTION

Short-range wireless systems have a range of less than one hundred meters, but may connect to the Internet to provide communication over longer distances. Short-range wireless systems include, but are not limited to, a wireless personal area network (PAN) and a wireless local area network (LAN). A wireless PAN uses low-cost, low-power wireless devices that have a typical range of ten meters. An example of a wireless PAN technology is the Bluetooth Standard. The Bluetooth Standard operates in the 2.4 GHz Industrial, Scientific, and Medical (ISM) band and provides a peak air-link speed of one Mbps and a power consumption low enough for use in personal, portable electronics such as a personal digital assistance or mobile phone. A description of the Bluetooth communication protocol and device operation principles is in *Bluetooth Special Interest Group, Specification of the Bluetooth System*, version 1.1, volumes 1 and 2, Feb. 22, 2001. Another example of a wireless PAN technology is a standard for transmitting data via infrared light waves developed by the Infrared Data Association (IrDA), a group of device manufacturers. IrDA ports enable computers, such as a laptop, or devices, such as a printer, to transfer data from one device to another without any cables. IrDA ports support roughly the same transmission rates as traditional parallel ports and the only restriction on their use is that the two devices must be within a few feet of each other and have a clear line of sight. A wireless LAN is more costly than a wireless PAN, but has a longer range. An example of a wireless LAN technology is the IEEE 802.11 Wireless LAN Standard and the HIPERLAN Standard. The HIPERLAN Standard operates in the 5 GHz Unlicensed-National Information Infrastructure (U-NII) band and provides a peak air-link speed between ten and one hundred Mbps.

An ad-hoc network is a short-range wireless system comprising an arbitrary collection of wireless devices that are physically close enough to exchange information. An ad-hoc network is constructed quickly with wireless devices joining and leaving the network as they enter and leave the proximity of the remaining wireless devices. An ad-hoc network also may include one or more access points, that is, stationary wireless devices operating as a stand-alone server or as gateway connections to other networks.

In the future, the Bluetooth Standard will likely support the interconnection of multiple piconets to form a multi-hop ad-hoc network, or scatternet, In a scatternet, a connecting device forwards traffic between different piconets. The connecting device may serve as a master device in one piconet, but as a slave device or a master device in another piconet. Thus, the connecting devices join the piconets that comprise a scatternet by adapting the timing and hop sequence to the respective piconet and possibly changing the roles that they serve from a master device to a slave device.

A Bluetooth device includes, but is not limited to, a mobile telephone, personal or laptop computer, radio-frequency identification tag, and personal electronic device such as a personal digital assistant (PDA), pager, or portable-computing device. Each Bluetooth device includes application and operating system programs designed to find other Bluetooth devices as they enter and leave the communication range of the network. The requesting Bluetooth device in a client role and the responding Bluetooth device in a server role establish a proximity link between the two devices. The requesting and responding Bluetooth device use the proximity link and a service discovery protocol to discover the services offered by the other Bluetooth device and how to connect to those services.

In a traditional computing environment, an application program that is running in a computer is resident in the memory of the computer and is constrained by factors such as the memory size, processor speed, and resources. Typically, these factors do not impose limits on the application. The user controls the application (i.e., when an application is started, closed, and its relationship to other applications) using a shell program or a graphical desktop environment. The ability to auto-start or pre-configure the application exists, but only in the context of Plug-n-Play drivers and interfaces.

In a wireless computing environment, the computing environment necessitates strict application control in terminal devices. First, the number of bytes of memory that the user interface requires in a mobile device restricts the ability to run applications in parallel. Second, a user typically cannot control the establishment of a proximity connection between two peer devices. The user may know that there is a high probability of establishing the proximity connection, but cannot reliably predict the time or place of the establishment. Third, when multiple applications must be presented, the order that the applications will be presented to a user depends on factors such as the user's preferences and the configuration of the server. The server may combine several applications and run those applications in a certain order because the server's instructions indicate that the certain order will optimize the experience for the user. For example, a browsing application will run first to view a movie file, then a banking application will run to purchase a ticket, followed by a ticketing application to accept the purchased ticket, and finally, a convenience application will run to change the telephone ring to silent mode. Fourth, an application can be dynamically loaded and run on a terminal device (e.g., applets). In addition to security issues, this ability of the terminal device raises issues regarding the user's control of the terminal device.

Thus, there is a need for a system and method for controlling access to an application program in a wireless device connected to a spontaneous and instant (ad-hoc) communications network. The system and method will allow a user or service provider to create a rule set that describes the desired behavior of the application programs. The rule set will define the automatic launching of the application programs and the allowed behavior of the application programs following the establishment of a proximity connection. The present invention addresses this need.

SUMMARY OF THE INVENTION

A computer system, method, and computer program product for controlling access to an application program in a wireless device connected to an ad-hoc communications network. The method comprises sending an inquiry message to the ad-hoc communications network, receiving a response to the inquiry message from a nearby wireless device, choosing a selected application from a list of application programs, and examining control parameters associated with the selected application. In one embodiment, the control parameters dictate a behavior of the selected application such as allowing communication with the selected application, refusing communication with the selected application, downloading the selected application, or distributing the selected application. When a nearby wireless device includes a matching application, the method further comprises sending a connection request to the nearby wireless device, receiving an accept connections message from the nearby wireless device, launching the selected application, and sending a service request to connect the selected application and the matching application. When a user closes the selected application that was launched, the method further comprises erasing the selected application. In one embodiment, to choose the selected application, the method further comprises retrieving an entry from an application directory stored in a middleware layer. Alternatively, the choice of the selected application is based on a priority assigned to the entry.

In another embodiment, the method comprises receiving an inquiry message, sending a response to the inquiry message, receiving a connection request, sending an accept connections message, receiving a service request to connect to an application, and examining control parameters associated with a matching application program for the application. In one embodiment, the control parameters dictate a behavior of the selected application such as allowing communication with the selected application, refusing communication with the selected application, downloading the selected application, or distributing the selected application. In another embodiment, the method further comprises launching the matching application, and receiving a service request to connect the selected application and the matching application. When a user closes the selected application that was launched, the method further comprises erasing the selected application.

BRIEF DESCRIPTION OF THE DRAWINGS

The accompanying figures best illustrate the details of the system and method for launching and controlling application programs resident in wireless devices in a spontaneous and instant (ad-hoc) communications network, both as to its structure and operation. Like reference numbers and designations in these figures refer to like elements.

FIG. 5 is a flow diagram of an embodiment of a process that illustrates the message flow during establishment of a communication session between terminal X and terminal Y in a mobile ad-hoc communications network.

DETAILED DESCRIPTION OF THE INVENTION

Figure 1:
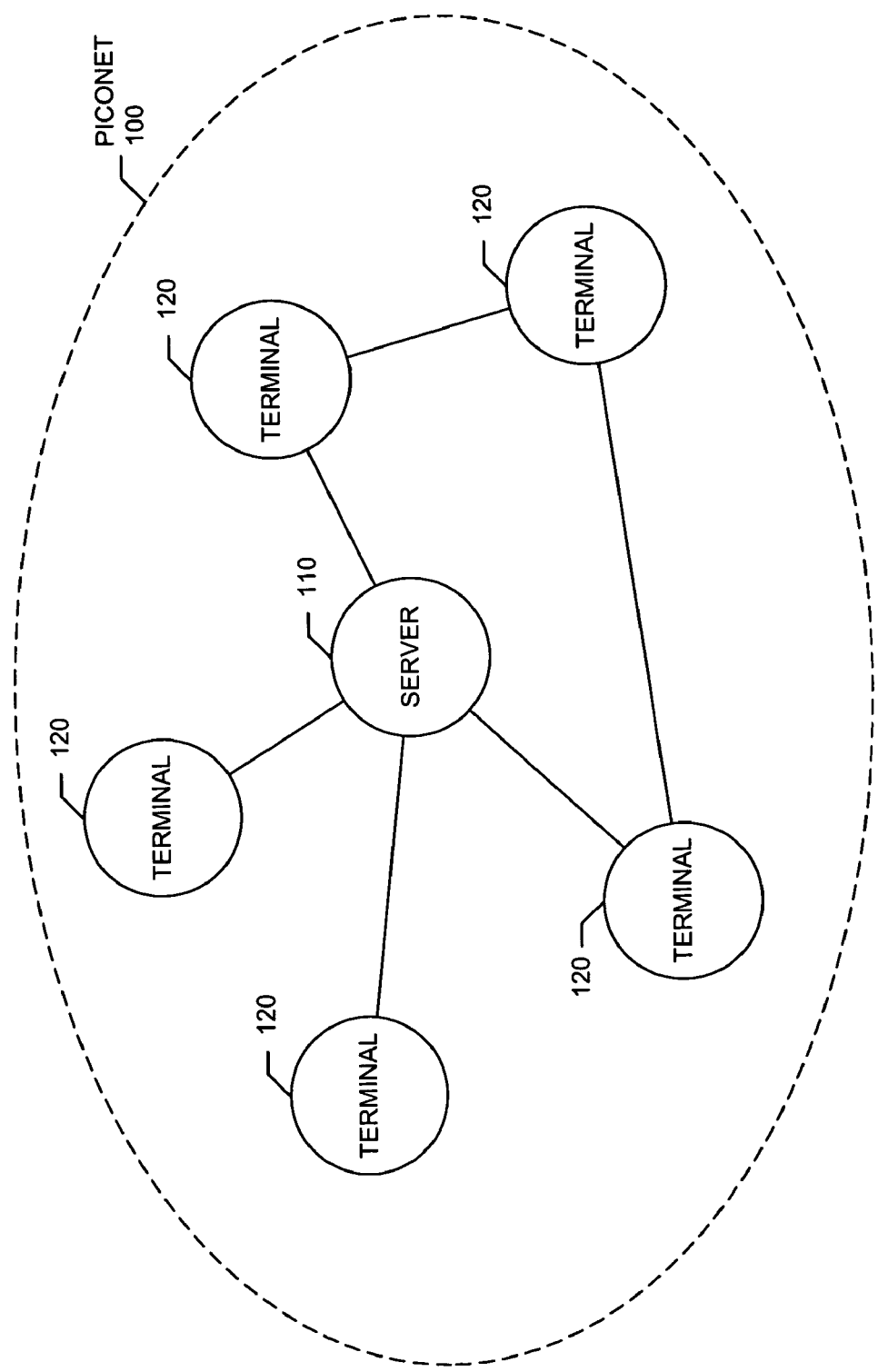
FIG. 1 is a network diagram that illustrates the interaction of the devices that comprise a mobile ad-hoc communications network, in accordance with one embodiment of the present invention.

FIG. 1 is a network diagram that illustrates the interaction of the devices that comprise a mobile ad-hoc communications network, in accordance with one embodiment of the present invention. In one embodiment, the mobile ad-hoc communications network is a Bluetooth piconet that includes one master device and up to seven active slave devices. As shown in FIG. 1, piconet 100 includes server 110 and five instances of terminal 120. Server 110 maintains the network clock and is the communication manager for each instance of terminal 120. Server 110 typically initiates an exchange of data with an instance of terminal 120. Two instances of terminal 120 typically communicate through the server 110 however, if two instances of terminal 120 communicate directly, one instance will assume the role of server, or master, and the other instance will assume the role of client, or slave.

Each device in the mobile ad-hoc communications network will either assume the role of a terminal device or a server device. A terminal device is a consumer of services that a single user operates. A terminal device includes devices such as a mobile phone or PDA. A server is typically a stationary device and only produces services. A server device creates a hotspot around them for using their services. "Hotspot" refers to the radio coverage area provided by the server device for detecting devices and discovering services offered by the applications hosted in the server. If the server device is not stationary, one of the terminal devices in the network will assume the role of application directory server and perform device detection and service discovery functions for the remaining terminal devices in the network. The disclosed invention introduces two roles among such terminal devices, application directory servers and terminals, where application directory servers serve terminals in device detection and service discovery. If stationary servers with hotspots exist, servers typically act as application directory servers however, device detection and service discovery is possible without such a stationary server because one of the terminals will assume the application directory server duties.

The disclosed invention assigns an identifier to each application placed under control. In one embodiment, the identifier is a non-unique identifier that abstractly identifies the application. In another embodiment, the identifier specifies a function that the application performs. In another embodiment, the identifier specifies a communication protocol that the application uses to communicate. Thus, the identifier may indicate that several occurrences of an application each occurrence authored in a different computer language, or targeted to run on a different hardware platform or fulfill a different application role may be considered to be the same because they can interoperate and fulfill the same function. However, in yet another embodiment, the identifier is a unique identifier that identifies the application.

Figure 2A:
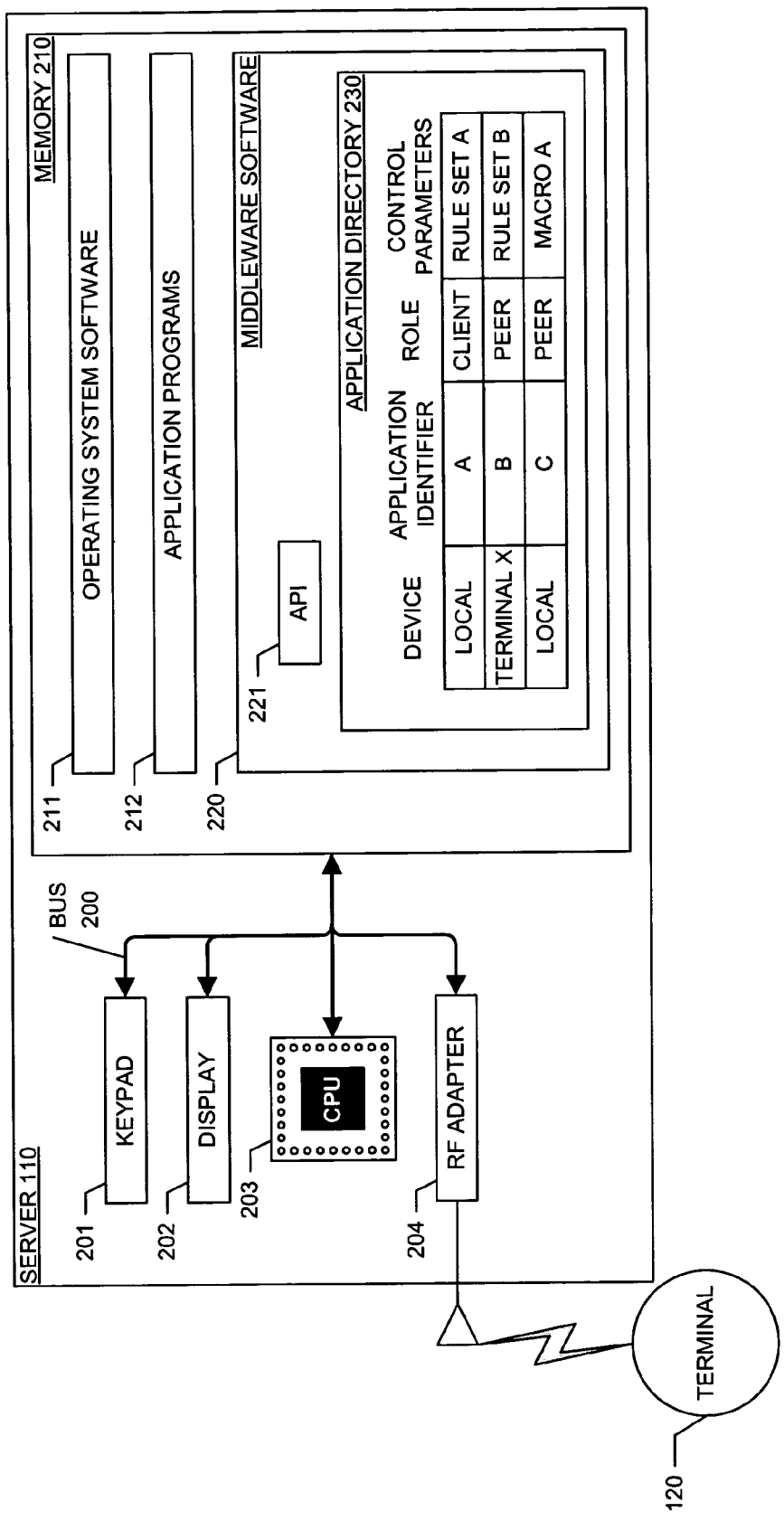
FIG. 2A is a block diagram that illustrates the hardware and software components comprising server 110 shown in FIG. 1, in accordance with one embodiment of the present invention.

FIG. 2A is a block diagram that illustrates the hardware and software components comprising server 110 shown in FIG. 1, in accordance with one embodiment of the present invention. Server 110 is a general-purpose wireless device. Bus 200 is a communication medium that connects keypad 201, display 202, central processing unit (CPU) 203, and radio frequency (RF) adapter 204 to memory 210. RF adapter 204 connects via a wireless link to terminal 120 and is the mechanism that facilitates network traffic between server 110 and terminal 120.

CPU 203 performs the methods of the disclosed invention by executing the sequences of operational instructions that comprise each computer program resident in, or operative on, memory 210. Memory 210 includes operating system software 211, application programs 212, and middleware software 220. Operating system software 211 controls keypad 201, display 202, RF adapter 204, and the management of memory 210. Application programs 212 control the interactions between a user and server 110. Middleware software 220 includes an application program interface (API) 221 that help an application program running on server 110 find and communicate with a counterpart application running on terminal 120. To quickly locate each application, middleware software 220 also includes application directory 230 to track, for each application that is resident in each device in piconet 100, a reference to the device storing the application, an identifier for the application, the role that the application performs, and the control parameters that define the user or service provider rules for controlling the application. In one embodiment, the reference to the device storing the application is the MAC address of the device.

Figure 2B:
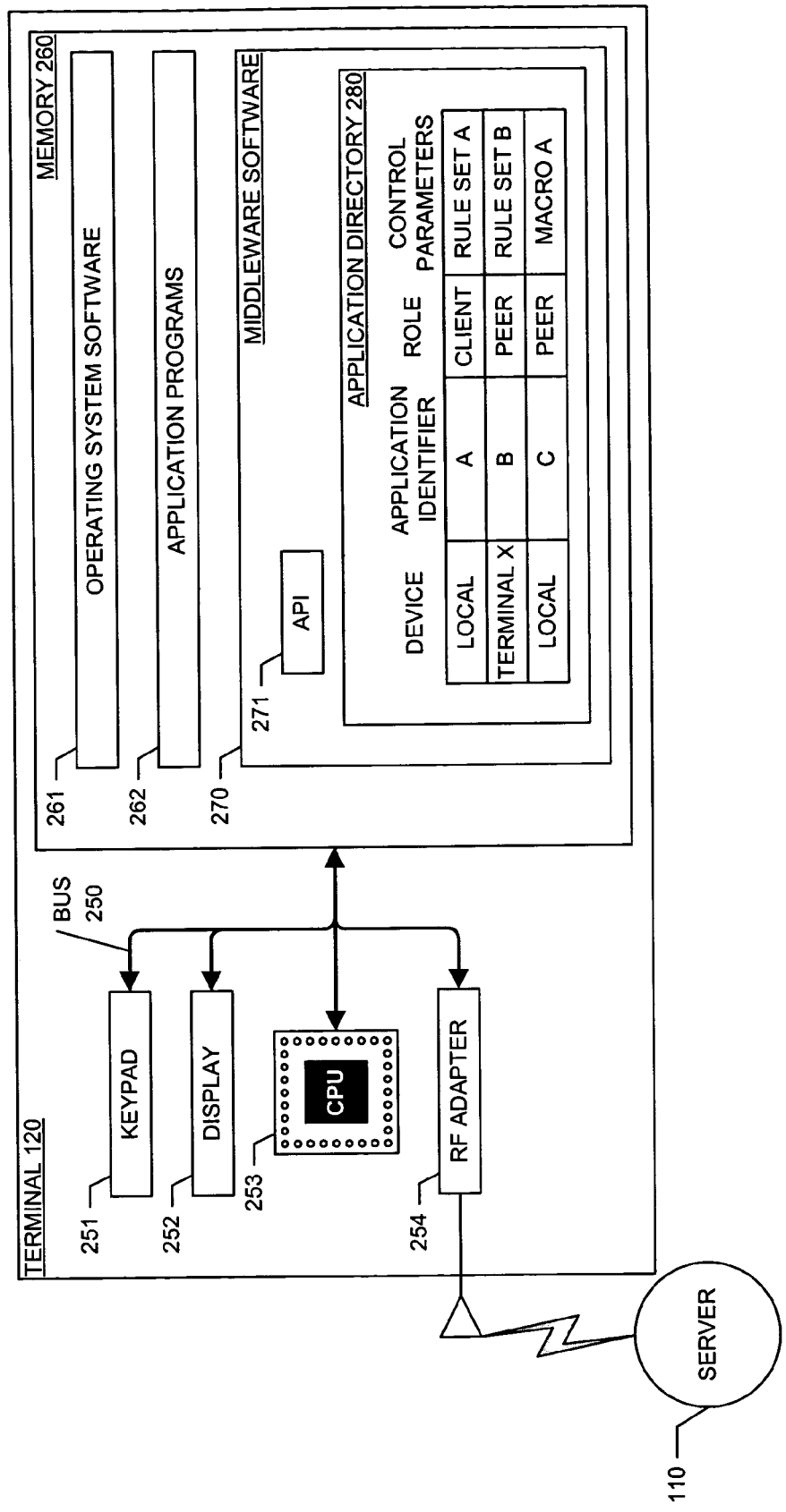
FIG. 2B is a block diagram that illustrates the hardware and software components comprising terminal 120 shown in FIG. 1, in accordance with one embodiment of the present invention.

FIG. 2B is a block diagram that illustrates the hardware and software components comprising terminal 120 shown in FIG. 1, in accordance with one embodiment of the present invention. Terminal 120 is a general-purpose wireless device. Bus 250 is a communication medium that connects keypad 251, display 252, CPU 253, and RF adapter 254 to memory 260. RF adapter 254 connects via a wireless link to server 110 or another terminal 120 and is the mechanism that facilitates network traffic between server 110 and terminal 120.

CPU 253 performs the methods of the disclosed invention by executing the sequences of operational instructions that comprise each computer program resident in, or operative on, memory 260. Memory 260 includes operating system software 261, application programs 262, and middleware software 270. Operating system software 261 controls keypad 251, display 252, RF adapter 254, and the management of memory 260. Application programs 262 control the interactions between a user and terminal 120. Middleware software 270 includes an API 271 that help an application program running on terminal 120 find and communicate with a counterpart application running on server 110 or another terminal 120. To quickly locate each application, middleware software 270 also includes application directory 280 to track, for each application that is resident in each device in piconet 100, a reference to the device storing the application, an identifier for the application, the role that the application performs, and the control parameters that define the user or service provider rules for controlling the application. In one embodiment, the reference to the device storing the application is the MAC address of the device.

In one embodiment, the configuration of memory 210 and memory 260 is identical. In another embodiment, the configuration of memory 210 and memory 260 only includes the software necessary to perform the essential tasks of server 110 and terminal 120, respectively. For example, if terminal 120 needs to receive a general inquiry access code, but does not need to send a general inquiry access code message, only the software that receives this message will reside in memory 260.

In the disclosed invention, the distributed application directory stored in the middleware software is a database that makes it possible for a device to know something of the requirements and wishes of peer devices to which it connects. The database also contains information of local applications and their requirements. The information includes control parameters, or combinations of control parameters, as well as priority information, indicating importance of the application set by the user. These control parameters are stored in the distributed application directory, or database, and are enforced by the middleware software. In one embodiment, there are three categories of control parameters, application states, user-defined application settings, and macros (i.e., combinations of user-defined application settings).

Application States

"Installed"—An application program state indicating that the application program is resident and installed in the local memory of a wireless device. When an application program is installed, the local memory includes a binary, or digital, image of the application program.

"In-Machine"—An application program state indicating that the application program is available to the middleware software, but a binary, or digital, image of the application program is not installed into the local memory. The In-Machine state is the result of an auto-launchable, non-persistent distribution of an application program.

"Running"—An application program state indicating that the application program is currently running in the wireless device. An application program that is auto-launched will achieve the Running state when it launches and is able to communicate with peer devices. However, even though an application program may not be marked as an Auto-Launch application program, the application program can still be started manually by a user and reach the Running state by user interaction.

User-Defined Application Settings

Auto-Launch—A user may configure an application program to automatically start in a wireless device when a possible communication opportunity is available. The Auto- Launch setting is available for an application program regardless of the application state, Installed, In-Machine, or Running.

Auto-Launch Priority—A numerical value in a given range (e.g., the range 0-127) that defines the willingness for a user to automatically launch an application program when several applications need to be automatically launched using a connection between pairs of wireless devices. The first application program to be launched is the application program having the highest sum of the two Auto-Launch Priority values, the local application priority and the application priority to the peer device. An application program already running in either device takes absolute priority over an application program that has not yet been launched. The example that follows illustrates this user-defined application setting.

Refused—A wireless device that is receiving connection requests may mark an application program as being banned from running on the wireless device. If this value is set, the associated application program will never be launched, moved, or proposed for download to the wireless device.

Wanted—An application program that is not installed in a wireless device, but that a user wants to run is a Wanted application program. This setting is an authorization by the user to download and install a binary image of the application program from another wireless device.

Distributable—An application program setting denoting that a peer device, typically in a server role, is prepared to distribute binary images of the associated application program to connected peer devices.

Erase-After-Use—A peer device, typically in a server role, can configure an application program to be Distributable and non-persistent. Thus, the application program can be given to a peer device in order to establish communication, but the application program will never be installed on the peer device because it is automatically erased from the peer device after the use. Typical examples of this type of application program includes banking clients or multi-player game clients.

Macros

Auto-Download—If the middleware software database information indicates that an application program is not installed in a local device, is an Auto-Launch or Wanted application, has been marked by a peer device as Distributable, as well as Auto-Launchable or Running, the application program should be downloaded and eventually launched. However, if the non-persistent flag is set, the application program may disappear after being used.

Downloadable—If the middleware software database information indicates that an application program is marked as Distributable in the peer, and is locally not an Auto-Launch application or a Wanted application, and is neither Installed nor Refused, then the application program is available to be downloaded and installed. A common case satisfying the above requirement is that there is no mention about the application in the local device, and it is marked as Distributable in the peer device.

Auto-Launch-Everything—This macro has certain limits, but is accomplished by having an Auto-Launch application program in a client wireless device that takes information of Distributable application programs in a server wireless device, and configures the middleware software to Auto-Launch those application programs. However, the user may define and introduce some restrictions.

Transfer and State Indications—When a device automatically launches an application, the device changes the state of the application from IDLE to RUNNING. Similarly, when a device terminates a running application, the device changes the state of the application from RUNNING to IDLE. This dynamic information is exchanged as part of the other application settings, because it is necessary, for example, when calculating the priority of the application. In addition, two application parameters, CLOSE and RELEASE-HISTORY, are never part of the parameter set and are only added and removed as additional data when parameter exchanges take place between specific peer devices. CLOSE is an indication to a given peer that the application session between the local device and the peer is closed, although the local application continues in a RUNNING state. CLOSE is used by server applications with respect to their clients. Normally, the fact that an application has been run and terminated between two peers is stored, and inhibits re-triggering of the same application as long as the data connection exists between the two devices. In some cases we want an application to be run again (e.g., the user starts the application manually after it has been automatically run once). In this case the RELEASE-HISTORY is sent to the peer device, releasing the memory regarding the given application, and a new session for the application in question can be established.

Figure 3A:
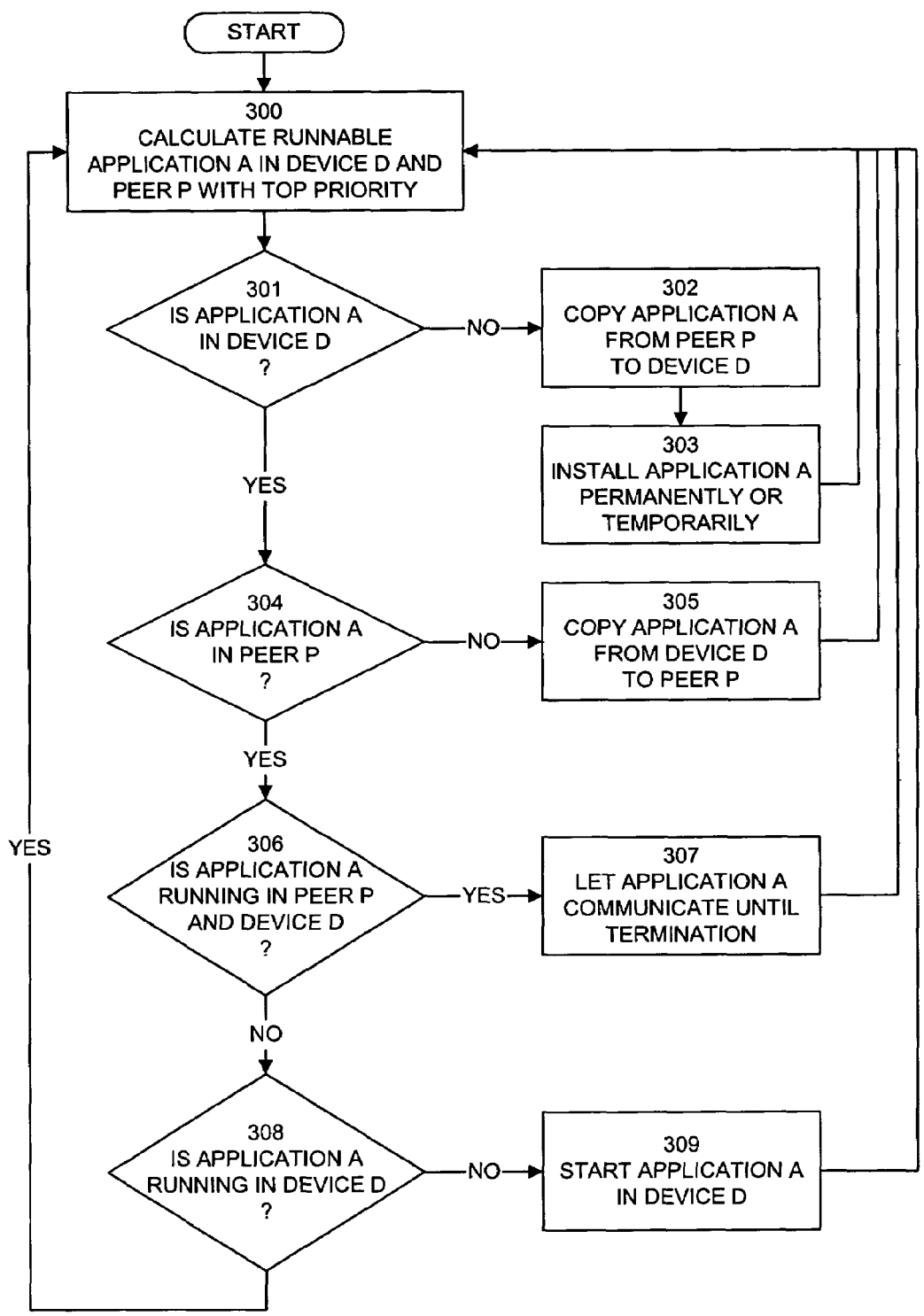
FIGS. 3A-3B are flow diagrams of an embodiment of a process that accesses the control parameters stored in the distributed application directory.
Figure 3B:
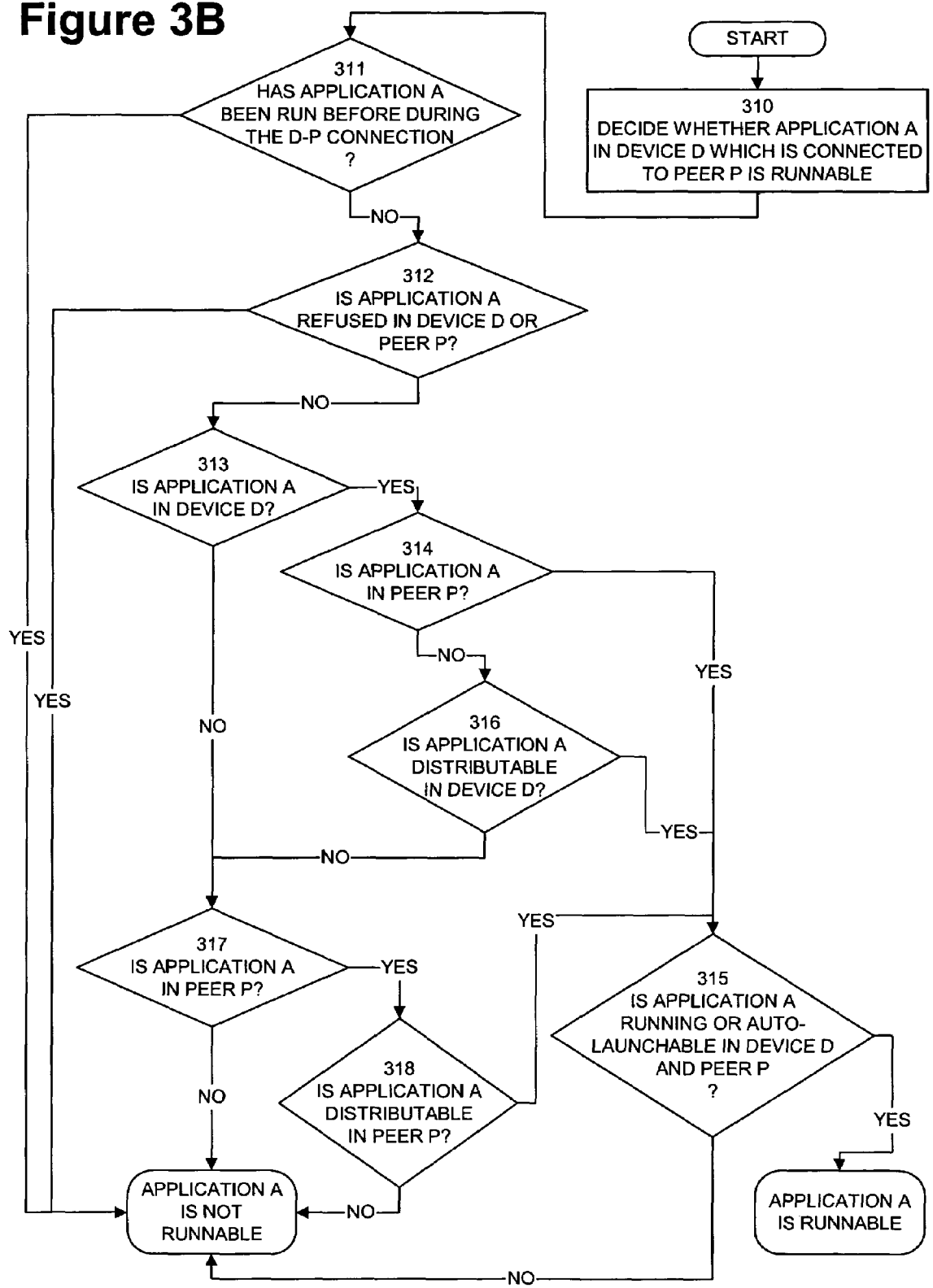

FIG. 3A and FIG. 3B are flow diagrams of an embodiment of a process that accesses the control parameters stored in the distributed application directory. FIG. 3A illustrates a portion of the process that accesses the control parameters to launch an application and enable two devices to communicate via the application. Furthermore, FIG. 3A corresponds to the example rule set macro that follows as "Example 1—Macro". FIG. 3B illustrates another portion of the process that accesses the control parameters to determine whether an application is runnable. Furthermore, FIG. 3B corresponds to the example rule set macro that follows as "Example 2—Macro Ordering".

The portion of the process shown in FIG. 3A illustrates the logic for starting application A when it is runnable in device D and peer P (step 300). The process first determines whether application A is in device D (step 301). If application A is not in device D, the process copies application A from peer P to device D (step 302) and installs application A either permanently or temporarily (step 303). If application A is in device D, the process then determines whether application A is in peer P (step 304). If application A is not in peer P, the process copies application A from device D to peer P (step 305). If application A is in peer P, the process then determines whether application A is running in peer P and device D (step 306). If application A is running in peer P and device D, the process establishes a link connection between device D and peer P and allows application A to communication until termination (step 307). If application A is not running in peer P and device D, the process then determines whether application A is running in device D (step 308). If application A is not running in device D, the process starts application A in device D (step 309). If application A is running in device D, the process then returns to the beginning of the logic for starting application A (step 300).

The portion of the process shown in FIG. 3B illustrates the logic for determining whether application A is runnable in device D which is connected to peer P (step 310). The process first determines whether application A has been run before during the link connection between device D and peer P (step 311). If application A has been run before during the link connection between device D and peer P, application is not runnable. If application A has not been run before during the link connection between device D and peer P, the process then determines whether the control parameters for application A in device D or peer P indicate that application A is refused (step 312). If application A is refused, application A is not runnable. If application A is not refused, the process then determines whether application A is in device D (step 313). If application A is in device D, the process then determines whether application A is in peer P (step 314). If application A is in peer P, the process then determines whether application A is running or auto-launchable in device D and peer P (step 315). If application A is running or auto-launchable in device D and peer P, application A is runnable. If application A is not running or auto-launchable in device D and peer P, application A is not runnable. If application A is not in peer P, the process then determines whether application A is distributable in device D (step 316). If application A is distributable in device D, the process then determines whether application A is running or auto-launchable in device D and peer P (step 315). If application A is running or auto-launchable in device D and peer P; application A is runnable. If application A is not running or auto-launchable in device D and peer P, application A is not runnable. If application A is not distributable in device D or if application A is not in device D, the process then determines whether application A is in peer P (step 317). If application A is in peer P, the process then determines whether application A is distributable in peer P (step 318). If application A is distributable in peer P, the process then determines whether application A is running or auto-launchable in device D and peer P (step 315). If application A is running or auto-launchable in device D and peer P, application A is runnable. If application A is not running or auto-launchable in device D and peer P, application A is not runnable. If application A is not in peer P, application A is not runnable.

Example 1 that follows is an example of a rule set macro for installing and starting application programs. In this example, L indicates a local wireless device, P indicates a peer device, COMM indicates that communication is possible, PULL or PUSH indicates the transfer of the installation package, LAUNCH indicates the launching of the application program, and INSTALL indicates the installing of an application program. This example omits all references to version and role control.

```
RUNNABLE_X = AUTOLAUNCH_X AND (INSTALLED_X OR IN_MACHINE_X) AND
NOT REFUSED_X
PULL_L = NOT INSTALLED_L AND NOT IN_MACHINE_L AND NOT REFUSED_L
AND DISTRIBUTABLE_P AND (WANTED_L OR AUTOLAUNCH_L)
PUSH_L = DISTRIBUTABLE_L AND NOT INSTALLED_P AND NOT
IN_MACHINE_P AND NOT REFUSED_P AND (WANTED_P OR AUTOLAUNCH_P)
DOWNLOADABLE_L = NOT INSTALLED_L AND NOT IN_MACHINE_L AND NOT
REFUSED_L AND DISTRIBUTABLE_P AND (NOT WANTED_L AND NOT
AUTOLAUNCH_L)
```

EXAMPLE 1

Macro

A state machine evaluates the macro shown in Example 1. The macro is evaluated for each application program separately with the additional dimensions of version control and roles. If ordering is necessary because many operations cannot be performed in parallel, the macro defines the ordering as well. The first priority is assigned to communicate, and the last priority is assigned to start the download of the application program. Example 2 illustrates one embodiment of the macro defining the ordering.

```
IF (RUNNING_L AND RUNNING_P) THEN COMM
ELSE IF (NOT RUNNING_L AND RUNNABLE_L AND
(RUNNING_P OR RUNNABLE_P)) THEN LAUNCH
ELSE IF PULL_L AND NOT PULLING THEN PULL
ELSE IF PUSH_L AND NOT PUSHING THEN PUSH
ELSE IF NOT INSTALLED_L AND IN_MACHINE_L AND NOT
NON_PERSISTENT_L AND NOT NON_PERSISTENT_P THEN
INSTALL
ELSE IF DOWNLOADABLE_L THEN START DOWNLOAD
APPLICATION
```

EXAMPLE 2

Macro Ordering

In one embodiment, the launching order for applications can also be set by selective database distribution in a strictly client-server architecture. However, an ordering can also be achieved by not setting applications to be Auto-Launch application programs and by dynamically altering the running flag.

In another embodiment, the Auto-Launch priority is a useful tool, but device-dependent. It works in a peer-to-peer or local setting when a client is talking to a server, but in a network there are possible dead-lock situations. This is primarily because the server device probably serves all customers and applications simultaneously, and only uses the priority to try to affect the launching order in client devices. Thus, the application programs should be prepared to close themselves if a peer device is not located.

Auto-Launch Priority Example

The Auto-Launch Priority order is best described by the following example. Two peer devices, Device A and Device B establish a connection. Device A and Device B have the following applications Installed and marked as Auto-Launch application programs.

| Device A: | CRASH-GAME (priority 100) |
| | SHARE-A-JOKE (priority 52) |
| | COPY-HOMEWORK (priority 36) |
| Device B: | SHARE-A-JOKE (priority 43) |
| | COPY-HOMEWORK (priority 71) |

In this example, Device A and Device B have two Auto-Launch application programs in common, COPY- HOMEWORK and SHARE-A-JOKE. COPY-HOMEWORK has an Auto-Launch Priority of 36+71=107. SHARE-A-JOKE has an Auto-Launch Priority of 52+43=95. Thus, COPY-HOMEWORK will start first because its Auto-Launch Priority of 107 is greater than the Auto-Launch Priority of 95 for SHARE-A-JOKE.

A necessary extension to this rule (to minimize deadlocks) is that application programs that are running in the peer device take absolute priority over application programs that are merely Auto-Launch programs. Thus, when Device A and Device B instead have the following applications Installed and marked as Auto-Launch application programs, the Auto-Launch Priority order should result in the order SHARE-A-JOKE, CRASH-GAME, COPY-HOMEWORK.

| Device A: | CRASH-GAME (priority 100) |
| | SHARE-A-JOKE (priority 52) |
| | COPY-HOMEWORK (priority 36) |
| Device B: | SHARE-A-JOKE (priority 43) (running) |
| | COPY-HOMEWORK (priority 71) |
| | CRASH-GAME (priority 0) |

FIGS. 4A-4D are flow diagrams of various embodiments of a process for application program control in a mobile ad-hoc communications network. The ad-hoc communications network connects a number of devices. FIGS. 4A-4D illustrate two of these devices, source device 400, and peer device 450.

Figure 4A:
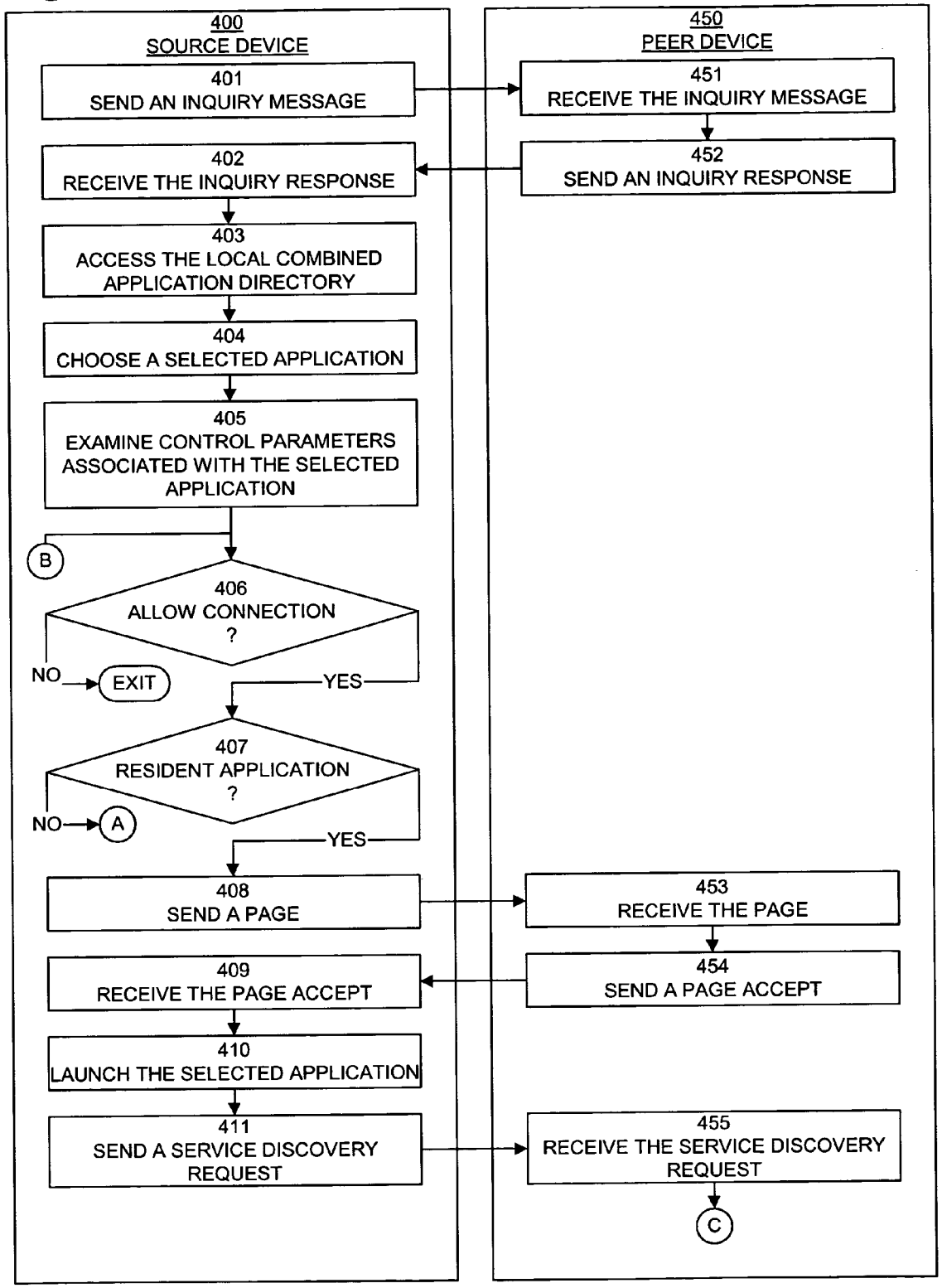
FIGS. 4A-4D are flow diagrams of various embodiments of a process for application program control in a mobile ad-hoc communications network.
Figure 4B:
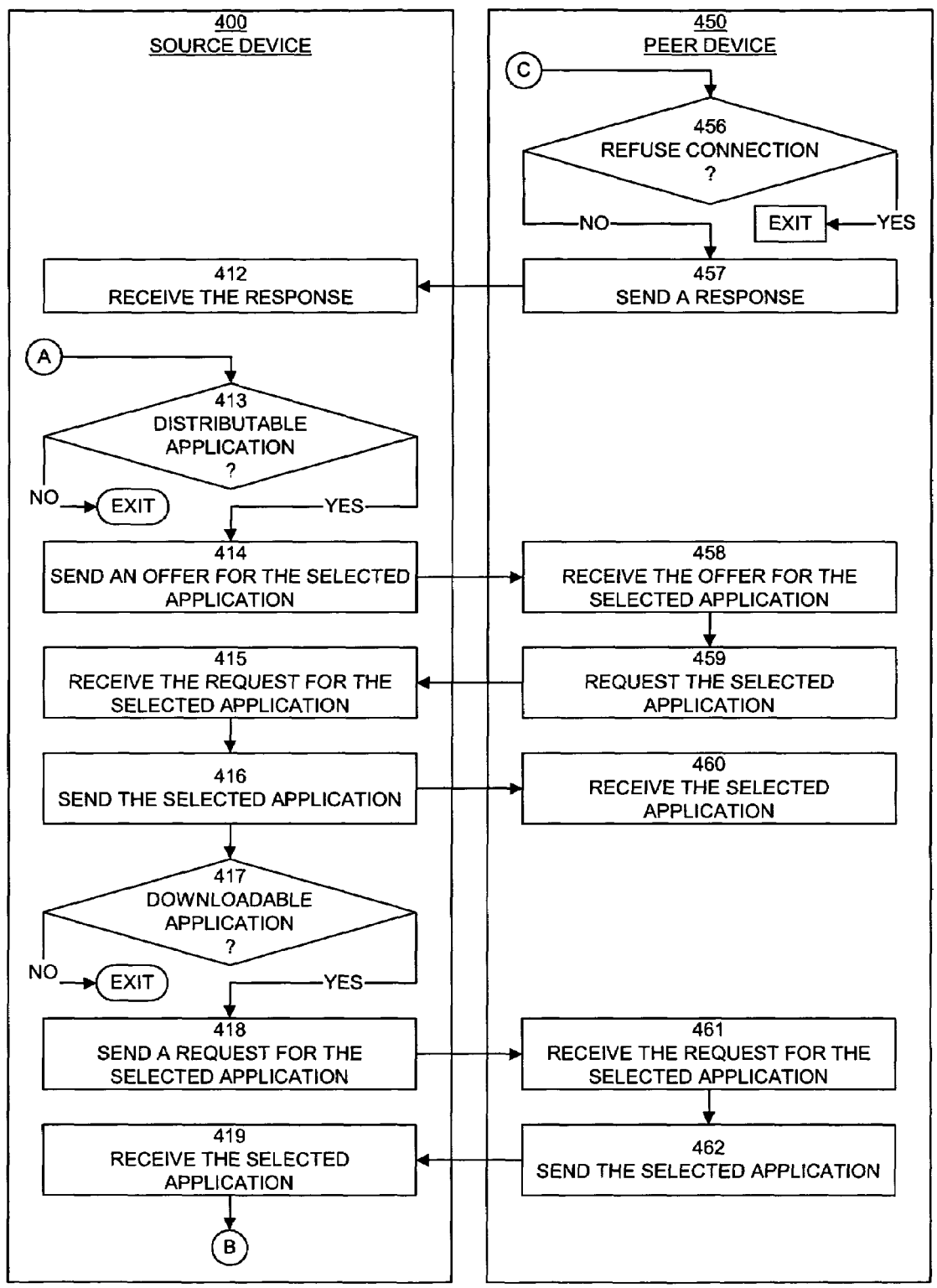

Source device 400 initiates the process shown in FIG. 4A by sending an inquiry request to the ad-hoc communications network (step 401). Peer device 450, one of the devices in the ad-hoc communications network that is in inquiry scan mode, receives the inquiry request (step 451) and responds by sending an inquiry response message (step 452). In one embodiment, the inquiry response message is a Bluetooth inquiry result command modified to indicate that peer device 450 includes a middleware layer. Source device 400 receives the inquiry response message (step 402). Source device 400 accesses the local combined application directory (step 403) stored in the middleware software portion of the memory for source device 400. Source device 400 chooses a selected application from the local combined application directory (step 404) and examines the control parameters associated with the selected application (step 405).

The control parameters provide several user-defined alternatives for each application, as well as, the ability to combine alternatives into a macro. The process first determines whether the control parameters allow a connection between the selected application running on source device 400 and a matching application running on peer device 450 (step 406). If the control parameters refuse a connection for this application on source device 400, the process exits. If the control parameters allow a connection for this application on source device 400, the process then determines whether the application program is resident in source device 400 (step 407).

If the application program is resident in source device 400, source device 400 sends a paging request message (step 408). Peer device 450 receives the paging request message (step 453) and sends a paging accept message in response (step 454). Source device 400 receives the paging accept message (step 409) and launches the selected application (step 410). Once the selected application is running, source device 400 sends a service discovery request (step 411). Peer device 450 receives the service discovery request (step 455) and decides whether to refuse the connection (step 456) based on the control parameters for the matching application for the selected application. If the control parameters specify to refuse the connection to the matching application, peer device 450 exits. If the control parameters specify to allow the connection to the matching application, peer device 450 sends a response to the service discovery request (step 457). Source device 400 receives the response (step 412) and communication begins between the selected application and the matching application. When the communication stops, source device 400 and peer device 450 may erase the selected application and the matching application, respectively, if the control parameters specify to erase after use.

If the application program is not resident in source device 400, source device 400 then determines whether the application program is distributable (step 413). If the application program is not distributable, the process exits. If the application program is distributable, source device 400 sends an offer for the selected application (step 414). Peer device 450 receives the offer for the selected application (step 458) and sends a request for the selected application in response (step 459). Source device receives the request for the selected application (step 415) and sends the selected application in response (step 416). Peer device 450 receives the selected application (step 460). Source device 400 then determines whether the application program is downloadable (step 417). If the application program is not downloadable, the process exits. If the application program is downloadable, source device 400 sends a request for the selected application (step 418). Peer device 450 receives the request for the selected application (step 461) and sends the selected application in response (step 463). Source device receives the download of the selected application (step 419). To start the newly downloaded application program, the process repeats by determining whether the control parameters allow a connection for the newly downloaded application on source device 400 (step 406).

Figure 4C:
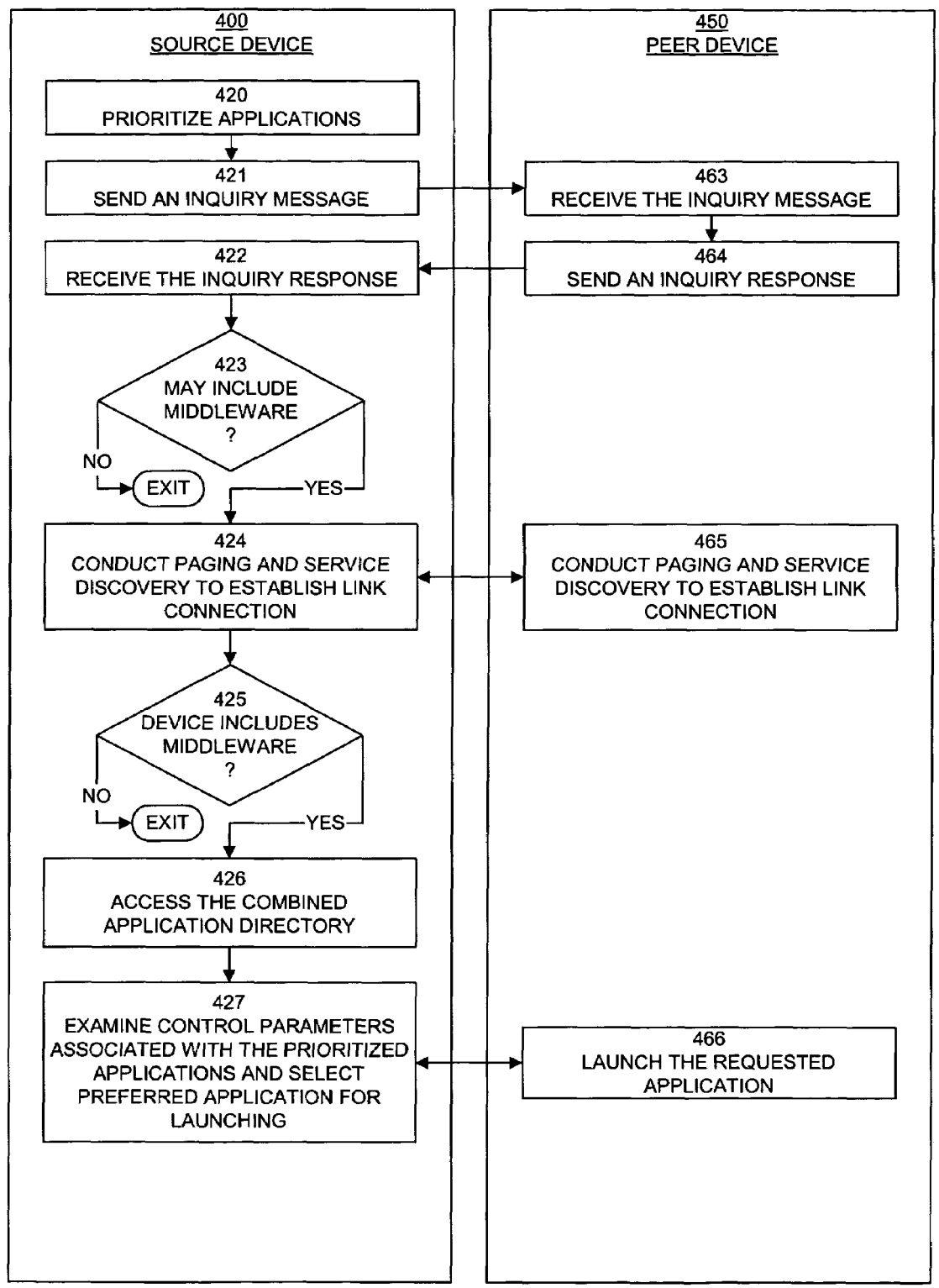

FIG. 4C illustrates a process for determining a preferred application from the applications found in peer device 450 after connection establishment between source device 400 and peer device 450. The process shown in FIG. 4C begins by prioritizing the applications in source device 400 (step 420). Typically, the user of source device 400 accesses the graphical user interface to prioritize the applications. In one embodiment, the prioritization includes specifying a preferred application from the applications that source device 400 can access. In another embodiment, the prioritization includes ordering from most important to least important every application that source device 400 can access. In yet another embodiment, the prioritization includes ordering from most important to least important a portion of the applications that source device 400 can access. Once the applications are prioritized, source device 400 sends an inquiry request to the ad-hoc communications network (step 421). Peer device 450, one of the devices in the ad-hoc communications network that is in inquiry scan mode, receives the inquiry request (step 463) and responds by sending an inquiry response message (step 464). In one embodiment, the inquiry response message is a Bluetooth inquiry result command modified to indicate that peer device 450 includes a middleware layer. Source device 400 receives the inquiry response message (step 422). Source device 400 examines the inquiry response message to determine whether the inquiry response message includes an indication that peer device 450 may include the middleware layer (step 423). If the inquiry response message does not include the indication, the process exits. If the inquiry response message includes the indication, source device 400 conducts paging and service discovery with peer device 450 to establish a link connection (step 424 and step 465). Following establishment of the link connection, source device 400 confirms whether peer device 450 includes the middleware layer (step 425). In one embodiment, a recognition request message and subsequent response message will confirm whether peer device 450 includes the middleware layer. If peer device 450 does not include the middleware layer, the process exits. If peer device 450 includes the middleware layer, source device 400 accesses the combined directory (step 426) and examines the control parameters associated with the prioritized applications and selects the preferred application for launching (step 427). Subsequently, peer device 450 launches the requested application (step 466).

In one embodiment, the distributed directory information includes the control parameters associated with the prioritized applications (i.e., preference information). Thus, the preference information is included in the distribution of the application directory for the peer device and determining whether to launch an application is a decision made by the source device locally using locally stored control parameters.

Figure 4D:
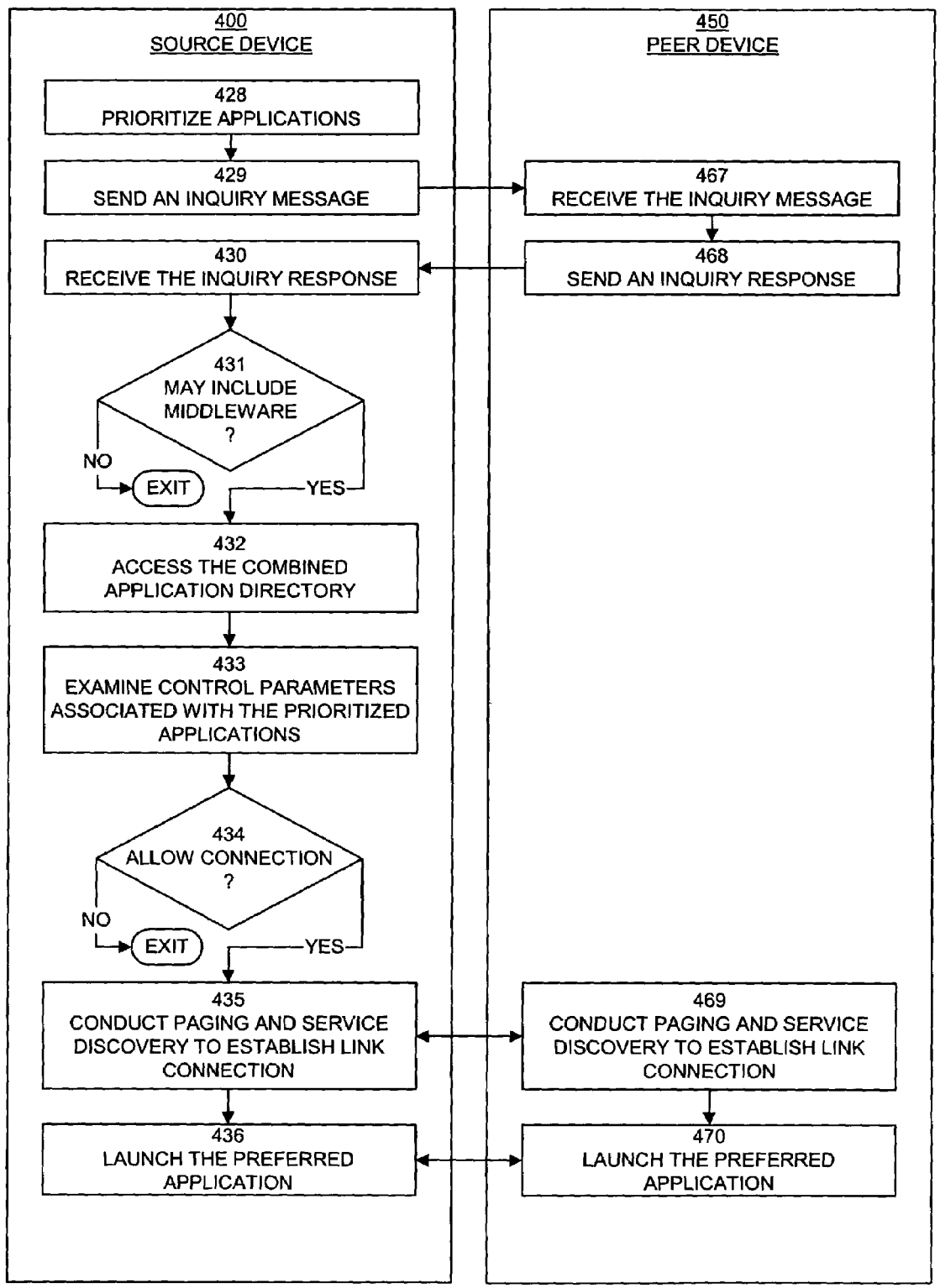

FIG. 4D illustrates a process for selecting peer device 450, before connection establishment, from a number of nearby devices because peer device 450 includes at least one preferred application. The process shown in FIG. 4D begins by prioritizing the applications in source device 400 (step 428). Typically, the user of source device 400 accesses the graphical user interface to prioritize the applications. In one embodiment, the prioritization includes specifying a preferred application from the applications that source device 400 can access. In another embodiment, the prioritization includes ordering from most important to least important every application that source device 400 can access. In yet another embodiment, the prioritization includes ordering from most important to least important a portion of the applications that source device 400 can access. Once the applications are prioritized, source device 400 sends an inquiry request to the ad-hoc communications network (step 429). Peer device 450, one of the devices in the ad-hoc communications network that is in inquiry scan mode, receives the inquiry request (step 467) and responds by sending an inquiry response message (step 468). In one embodiment, the inquiry response message is a Bluetooth inquiry result command modified to indicate that peer device 450 includes a middleware layer. Source device 400 receives the inquiry response message (step 430). Source device 400 examines the inquiry response message to determine whether the inquiry response message includes an indication that peer device 450 may include the middleware layer (step 431). If the inquiry response message does not include the indication, the process exits. If the inquiry response message includes the indication, source device 400 accesses the combined application directory (step 432) and examines the control parameters associated with the prioritized applications (step 433). The control parameters provide several user-defined alternatives for each application, as well as, the ability to combine alternatives into a macro. In one embodiment, the control parameter alternatives include allowing a connection between the selected application running on source device 400 and a matching application running on peer device 450 (step 434). If the connection is not allowed, the process exits. If the connection is allowed, source device 400 conducts paging and service discovery with peer device 450 to establish a link connection (step 435 and step 469). Following establishment of the link connection, source device 400 and peer device 450 launch the preferred application and begin communication (step 436 and step 470).

FIG. 5 is a flow diagram of an embodiment of a process that illustrates the message flow during establishment of a communication session between terminal X and terminal Y in a mobile ad-hoc communications network. In one embodiment, terminal X and terminal Y are mobile devices such as terminal 120 shown in FIG. 1 and FIG. 2B. In another embodiment, terminal X is a mobile device such as terminal 120 shown in FIG. 1 and FIG. 2B and terminal Y is a mobile device such as server 110 shown in FIG. 1 and FIG. 2A.

As shown in FIG. 5, terminal X initiates the communication by sending an inquiry request message to the mobile ad-hoc communications network. Since terminal Y is a nearby device, terminal Y receives the inquiry request message and sends an inquiry response message to terminal X. In one embodiment, the inquiry request message is a Bluetooth inquiry command and the inquiry response message is a Bluetooth inquiry result command. In another embodiment, the inquiry request message is a Bluetooth inquiry command and the inquiry response message is a Bluetooth inquiry result command modified to indicate that the terminal sending the Bluetooth inquiry result command includes a middleware layer. In one embodiment, the middleware layer includes dedicated middleware software providing advanced application and service discovery and execution. In one embodiment, the modification to the Bluetooth inquiry result command is to the Class of Device (CoD) parameters. For example, if the terminal sending the Bluetooth inquiry result command includes the middleware layer, the terminal will set at least the "ad-hoc networking aware" bit (bit 16) to on (1). Alternatively, if the terminal sending the Bluetooth inquiry result command includes the middleware layer, the terminal will set the "ad-hoc networking aware" bit (bit 16) to on (1), and the "location info" bit (bit 17) to off (0). Alternatively, if the terminal sending the Bluetooth inquiry result command includes the middleware layer, the terminal will set the "ad-hoc networking aware" bit (bit 16) to on (1), and the "telephony capable" bit (bit 22) to on (1). Alternatively, if the terminal sending the Bluetooth inquiry result command includes the middleware layer, the terminal will set the "ad-hoc networking aware" bit (bit 16) to on (1), the "location info" bit (bit 17) to off (0), and the "telephony capable" bit (bit 22) to on (1). In yet another embodiment, the modification to the Bluetooth inquiry result command is not necessary, if a dedicated indication parameter to indicate the presence of the middleware software is introduced to the Bluetooth inquiry result command specifications.

Following the inquiry, as shown in FIG. 5, terminal X may create a connection to each nearby device indicating possible possession of the middleware layer by the inquiry response message, such as terminal Y, by sending a paging request message. If terminal Y does not indicate possible possession of the middleware layer (e.g., by setting the "ad-hoc networking aware" bit (bit 16) to off (0)), no paging request message is transmitted and the communication session is disconnected. After conducting an inquiry including an indication that terminal Y possibly includes a middleware layer, terminal X sends the paging message request, as discussed above. Terminal Y receives the paging request message and optionally sends a paging accept message to accept the connection request. In one embodiment, the paging request message is a Bluetooth create connection command and the paging accept message is a Bluetooth accept connection request command.

Following the connection to each nearby device, as shown in FIG. 5, terminal X sends a recognition request message to confirm whether a nearby device such as terminal Y definitely includes the middleware layer. Terminal Y receives the recognition request message and sends a recognition response message to terminal X. In one embodiment, the receipt of the recognition response message is confirmation that terminal Y includes the middleware layer. In another embodiment, the content of the recognition response message will indicate whether terminal Y includes the middleware layer. In one embodiment, the recognition request message and the recognition response message utilize the Bluetooth Service Discovery Protocol (SDP). If terminal Y does not include the middleware layer, the communication session may be disconnected.

Following the confirmation that a nearby device such as terminal Y includes the middleware layer, as shown in FIG. 5, terminal X and terminal Y use the middleware layer to discover and launch applications and services. In one embodiment, terminal X and terminal Y use the methods disclosed in the flow diagrams shown in FIGS. 3A-3B and FIGS. 4A-4D to discover and launch applications and services.

Although the disclosed embodiments describe a fully functioning system and method for launching and controlling application programs resident in wireless devices in a mobile ad-hoc communications network, the reader should understand that other equivalent embodiments exist. Since numerous modifications and variations will occur to those who review this disclosure, the system and method for launching and controlling application programs resident in wireless devices in a mobile ad-hoc communications network is not limited to the exact construction and operation illustrated and disclosed. Accordingly, this disclosure intends all suitable modifications and equivalents to fall within the scope of the claims.

We claim:

1. A system, comprising:
 a memory device including a distributed application directory, the directory listing at least all applications resident in the wireless device; and
 a processor disposed in communication with the memory device for controlling access to an application program in the device, the processor configured to:
 exchange distributed application directory information with a nearby wireless device over a wireless ad-hoc communications network for providing a combined distributed application directory listing;
 choose a selected application from a list of application programs in the combined distributed applications directory;
 assign a priority for the selected application based on the combined distributed applications directory, wherein the priority is calculated from a local application priority and corresponding application priority of the nearby device;
 examine at least one control parameter from the group comprising application states; user-defined application settings and macros, wherein the macros comprise (i) auto-download, (ii) downloadable, (iii) auto-launch-everything and (iv) transfer and state indications in the combined distributed applications directory associated with the selected prioritized application; and
 determine a behavior for the selected application based on the assigned priority and the at least one control parameter.

2. The system of claim 1, wherein said at least one control parameter dictates a behavior of the selected prioritized application.

3. The system of claim 2, wherein to choose the selected prioritized application, the processor is further configured to:
 retrieve an entry from the distributed application directory stored in a middleware layer portion of the memory device, the entry associating the selected prioritized application and the nearby device and including said at least one control parameter.

4. The method of claim 1 wherein the selected application is a preferred application in the list of applications prioritized by the user according to preference or importance.

5. A system, comprising:
 a memory device including a distributed application directory in a middleware layer, the directory listing all applications resident in each device in an ad-hoc network; and
 a processor disposed in communication with the memory device for controlling access to an application program in the device, the processor configured to:
 send an inquiry message to the ad-hoc communications network;
 receive a response to the inquiry message from a nearby wireless device;
 choose a selected application from a list of prioritized application programs in the distributed applications directory by retrieving an entry from the distributed application directory stored in the middleware layer portion of the memory device, the entry associating the selected prioritized application and the nearby device and including said at least one control parameter; and
 examine at least one control parameter from the group comprising application states;
 user-defined application settings and macros, wherein the macros comprise (i) auto-download, (ii) downloadable, (iii) auto-launch-everything and (iv) transfer and state indications associated with the selected prioritized application, wherein said at least one control parameter dictates a behavior of the selected prioritized application;
 wherein the choice of the selected application is based on a priority assigned to the entry, wherein the priority is calculated from a local application priority and the corresponding application priority to the nearby device.

6. The system of claim 5, wherein the behavior includes allowing communication with the selected prioritized application, refusing communication with the selected prioritized application, downloading the selected prioritized application, or distributing the selected prioritized application.

7. The system of claim 5, wherein when a matching application is resident on the nearby wireless device, the processor is further configured to:
 send a connection request to the nearby wireless device;
 receive an accept connections message from the nearby wireless device;
 launch the selected prioritized application; and
 send a service request to connect the prioritized and the matching application.

8. The system of claim 7, wherein when a user closes the selected prioritized application, the processor is further configured to:
 erase the selected prioritized application, if specified by the associated control parameters.

9. A method, comprising:

exchanging distributed application directory information with a nearby wireless device over a wireless ad-hoc communications network for providing a combined distributed application directory listing;

choosing a selected application from a list of application programs in the combined distributed applications directory, the directory listing all applications resident in each device in the ad-hoc network;

assigning a priority for the selected application based on the combined distributed applications directory, wherein the priority is calculated from a local application priority and corresponding application priority of the nearby device;

examining at least one control parameter from the group comprising application states; user-defined application settings and macros, wherein the macros comprise (i) auto-download, (ii) downloadable, (iii) auto-launch-everything and (iv) transfer and state indications in the combined distributed applications directory associated with the selected application for controlling access to the selected application; and determining a behavior for the selected application based on the assigned priority and the at least one control parameter.

10. The method of claim 9, wherein said at least one control parameter dictates a behavior of the selected application.

11. The method of claim 10, wherein the choosing of the selected application further comprises:

retrieving an entry from the distributed application directory stored in a middleware layer portion of a memory device, the entry associating the selected application and the nearby device and including said at least one control parameter.

12. The method of claim 9 further comprising:

performing application and service discovery after the response to the inquiry wherein in response to the discovery a list of available applications program is created in the distributed applications directory for the ad-hoc network.

13. The method of claim 9 wherein the control parameters is a resultant of the examination of both the wireless device and nearby wireless device control parameters, and the selected application is controlled based on the associated parameter information.

14. The method of claim 13 wherein the control parameters are in categories including (i) application states, (ii) user-defined application settings and (iii) and macros or combinations of user-defined application settings.

15. A method comprising:

sending an inquiry message to the ad-hoc communications network;

receiving a response to the inquiry message from a nearby wireless device;

choosing a selected application from a list of prioritized application programs in a distributed applications directory, the directory listing all applications resident in each device in an ad-hoc network;

examining at least one control parameter associated from the group comprising application states; user-defined application settings and macros, wherein the macros comprise (i) auto-download, (ii) downloadable, (iii) auto-launch-everything and (iv) transfer and state indications with the selected application for controlling access to the selected application, wherein said at least one control parameter dictates a behavior of the selected application; and retrieving an entry from the distributed application directory stored in the middleware layer portion of a memory device, the entry associating the selected application and the nearby device and including said at least one control parameter;

wherein the choice of the selected application is based on a priority assigned to the entry, wherein the priority is calculated from a local application priority and the corresponding application priority to the nearby device.

16. The method of claim 15, wherein the behavior includes allowing communication with the selected application, refusing communication with the selected application, downloading the selected application, or distributing the selected application.

17. The method of claim 15, wherein when a matching application is resident on the nearby wireless device, the method further comprises:

sending a connection request to the nearby wireless device;

receiving an accept connections message from the nearby wireless device;

launching the selected application; and sending a service request to connect the selected application and the matching application.

18. The method of claim 17, wherein when a user closes the selected application, the method further comprises:

erasing the selected application, if specified by the associated control parameters.

19. A computer readable medium encoded with computer executable instructions, comprising:

a computer readable medium storing;

program code for exchanging distributed application directory information with a nearby wireless device over a wireless ad-hoc communications network for providing a combined distributed application directory listing;

program code for choosing a selected application from a list of application programs in the combined distributed applications directory;

program code for assigning a priority for the selected application based on the combined distributed applications directory, wherein the priority is calculated from a local application priority and corresponding application priority of the nearby device;

program code for examining at least one control parameter from the group comprising application states; user-defined application settings and macros, wherein the macros comprise (i) auto-download, (ii) downloadable, (iii) auto-launch-everything and (iv) transfer and state indications in the combined distributed applications directory associated with the selected application for controlling access to the selected prioritized application; and program code for determining a behavior for the selected application based on the assigned priority and the at least one control parameter.

20. The computer readable medium of claim 19, the computer readable medium further storing:

program code for sending a connection request to the nearby wireless device when a matching application is resident on the nearby wireless device;

program code for receiving an accept connections message from the nearby wireless device when a matching application is resident on the nearby wireless device;

program code for launching the selected application when a matching application is resident on the nearby wireless device; and program code for sending a service request to connect the selected application and the matching application when a matching application is resident on the nearby wireless device.

21. The computer readable medium claim 20, the computer readable medium further storing;
program code for erasing the selected application when a user closes the selected application, if specified by the associated control parameters.

22. The computer readable medium of claim 19, wherein the program code for choosing of the selected application further comprises:
program code for retrieving an entry from an application directory stored in a middleware layer portion of the memory device, the entry associating the selected application and the nearby device and including said at least one control parameter.

23. A system, comprising:
a memory device including a distributed applications directory; and
a processor disposed in communication with the memory device for controlling access to a selected prioritized application in the device, the processor configured to:
receive a service request from a nearby wireless device over a wireless ad-hoc communications network to connect to an application;
exchange distributed application directory information with the nearby wireless device for providing a combined distributed application directory listing;
assign a priority for the requested application based on the combined distributed applications directory, wherein the priority is calculated from a local application priority and corresponding application priority of the nearby device;
examine at least one control parameter from the group comprising application states; user-defined application settings and macros, wherein the macros comprise (i) auto-download, (ii) downloadable, (iii) auto-launch-everything and (iv) transfer and state indications in the combined distributed applications directory associated with a matching application program in the nearby device for connection to the requested prioritized application; and
determine a behavior for the requested application based on the assigned priority and the at least one control parameter.

24. The system of claim 23, wherein said at least one control parameter dictates a behavior of the matching application.

25. The system of claim 24, wherein the behavior includes allowing communication with the selected prioritized application, refusing communication with the selected prioritized application, downloading the selected prioritized application, or distributing the selected prioritized application.

26. The system of claim 24, wherein the processor is further configured to:
launch the selected prioritized application; and
receive a service request to connect the selected prioritized application and the matching application.

27. The system of claim 26, wherein when a user closes the matching application, the processor is further configured to:
erase the selected prioritized application, if specified by the associated control parameters.

28. A method comprising:
receiving a service request from a nearby wireless device over a wireless ad-hoc communications network to connect to an application
exchanging distributed application directory information with the nearby wireless device for providing a combined distributed application directory listing;
assigning a priority for the requested application based on the combined distributed applications directory, wherein the priority is calculated from a local application priority and corresponding application priority of the nearby device;
examining at least one control parameter from the group comprising application states; user-defined application settings and macros, wherein the macros comprise (i) auto-download, (ii) downloadable, (iii) auto-launch-everything and (iv) transfer and state indications in the combined distributed applications directory associated with a matching application program for the requested prioritized application for controlling access to the requested prioritized application.

29. The method of claim 28, wherein said at least one control parameter dictates a behavior of the matching application.

30. The method of claim 29, wherein the behavior includes allowing communication with the selected prioritized application, refusing communication with the selected prioritized application, downloading the selected prioritized application, or distributing the selected prioritized application.

31. The method of claim 29, further comprising:
launching the matching application; and
receiving a service request to connect the selected prioritized application and the matching application.

32. The method of claim 31, wherein when a user closes the matching application, the method further comprises:
erasing the selected prioritized application, if specified by the associated control parameters.

33. A computer readable medium encoded with computer executable instructions, comprising:
a computer readable medium storing:
program code for receiving a service request from a nearby wireless device over a wireless ad-hoc communications network to connect to an application;
program code for exchanging distributed application directory information with the nearby wireless device for providing a combined distributed application directory listing;
program code for assigning a priority for the requested application based on the combined distributed applications directory, wherein the priority is calculated from a local application priority and corresponding application priority of the nearby device;
program code for examining at least one control parameter from the group comprising application states; user-defined application settings and macros, wherein the macros comprise (i) auto-download, (ii) downloadable, (iii) auto-launch-everything and (iv) transfer and state indications in the combined distributed applications directory associated with a matching application program for the requested prioritized application.

34. The computer readable medium of claim 33, the computer readable medium further storing;
program code for launching the matching application; and
program code for receiving a service request to connect the selected prioritized application and the matching application.

35. The computer program readable medium of claim 34, the computer readable medium further storing:
   program code for erasing the selected prioritized application when a user closes the matching application, if specified by the associated control parameters.

36. A system, comprising:
   a memory device; and
   a processor disposed in communication with the memory device, the processor configured to:
   maintain a local information database including a distributed directory, the directory listing all applications resident in each device in an ad-hoc network in each said at least one device, the local information database associating at least one prioritized application program with at least one control parameter, said at least one application program including said at least one prioritized application program, and said at least one prioritized application program including a preferred application program;
   conduct an inquiry of the ad-hoc communications network to discover at least one nearby device in said at least one device, the inquiry including an indication that said at least one nearby device may include a middleware layer;
   exchange distributed application directory information with a nearby wireless device over the wireless ad-hoc communications network for providing a combined distributed application directory listing;
   access the combined distributed application directory listing to identify the preferred application program in said at least one prioritized application program;
   assign a priority for the selected application based on the combined distributed applications directory, wherein the priority is calculated from a local application priority and corresponding application priority of the nearby device; and
   access the local information database to examine in the combined distributed applications directory said at least one control parameter from the group comprising application states; user-defined application settings and macros, wherein the macros comprise (i) auto-download, (ii) downloadable, (iii) auto-launch-everything and (iv) transfer and state indications associated with the preferred application program.

37. The system of claim 36, wherein said at least one control parameter associated with the preferred application program dictates a behavior of a peer device in said at least one nearby device toward the preferred application program.

38. The system of claim 37, wherein the behavior includes allowing communication with the preferred application program.

39. The system of claim 36, wherein the local information database further includes preference information relating to said at least one application program.

40. The system of claim 39, wherein the preference information includes a preference of a peer device in said at least one nearby device for one of said at least one application program.

41. The system of claim 36, wherein a user of the wireless device selects said at least one prioritized application program and defines said at least one control parameter associated with each said at least one prioritized application program.

42. The system of claim 36, wherein a program resident in the wireless device monitors actions performed by a user of the wireless device to select said at least one prioritized application program and define said at least one control parameter associated with each said at least one prioritized application program.

43. The system of claim 36 wherein the inquiry to discover and identify the preferred application is performed by the middleware layer of the wireless device in response to detecting the middleware layer in the nearby device.

44. A method, comprising:
   maintaining a local information database including a distributed application directory, the directory listing all applications resident in each device in an ad-hoc network in each said at least one device, the local information database associating at least one prioritized application program with at least one control parameter, said at least one application program including said at least one prioritized application program, and said at least one prioritized application program including the preferred application program;
   conducting an inquiry of the ad-hoc communications network to discover at least one nearby device in said at least one device, the inquiry including an indication that said at least one nearby device may include a middleware layer;
   exchanging distributed application directory information with a nearby wireless device over the wireless ad-hoc communications network for providing a combined distributed application directory listing;
   accessing the combined distributed application directory listing to identify the preferred application program in said at least one prioritized application program;
   assigning a priority for the selected application based on the combined distributed applications directory, wherein the priority is calculated from a local application priority and corresponding application priority of the nearby device; and
   accessing the local information database to examine in the combined distributed applications directory said at least one control parameter from the group comprising application states; user-defined application settings and macros, wherein the macros comprise (i) auto-download, (ii) downloadable, (iii) auto-launch-everything and (iv) transfer and state indications associated with the preferred application program.

45. The method of claim 44, wherein said at least one control parameter associated with the preferred application program dictates a behavior of a peer device in said at least one nearby device toward the preferred application program.

46. The method of claim 45, wherein the behavior includes allowing communication with the preferred application program.

47. The method of claim 44, wherein the local information database further includes preference information relating to said at least one application program.

48. The method of claim 47, wherein the preference information includes a preference of a peer device in said at least one nearby device for one of said at least one application program.

49. The method of claim 44, wherein a user of the wireless device selects said at least one prioritized application program and defines said at least one control parameter associated with each said at least one prioritized application program.

50. The method of claim 44, wherein a monitor program resident in the wireless device monitors actions performed by a user of the wireless device to select said at least one prioritized application program and define said at least one control parameter associated with each said at least one prioritized application program.

51. A computer readable medium encoded with computer executable instructions, comprising:
a computer readable medium storing;
program code for maintaining a local information database including a distributed application directory, the directory listing all applications resident in each device in an ad-hoc network in each said at least one device, the local information database associating at least one prioritized application program with at least one control parameter, said at least one application program including said at least one prioritized application program, and said at least one prioritized application program including the preferred application program;
program code for conducting an inquiry of the ad-hoc communications network to discover at least one nearby device in said at least one device, the inquiry including an indication that said at least one nearby device may include a middleware layer;
program code for exchanging distributed application directory information with a nearby wireless device over the wireless ad-hoc communications network for providing a combined distributed application directory listing;
program code for accessing the combined distributed application directory listing to identify the preferred application program in said at least one prioritized application program;
program code for assigning a priority for the selected application based on the combined distributed applications directory, wherein the priority is calculated from a local application priority and corresponding application priority of the nearby device; and
program code for accessing the local information database to examine in the combined distributed applications directory said at least one control parameter from the group comprising application states; user-defined application settings and macros, wherein the macros comprise (i) auto-download, (ii) downloadable, (iii) auto-launch-everything and (iv) transfer and state indications associated with the preferred application program.

52. A system, comprising:
means for maintaining a local information database including a distributed applications directory, the directory listing all applications resident in each device in an ad-hoc network in each said at least one device, the local information database associating at least one prioritized application program with at least one control parameter, said at least one application program including said at least one prioritized application program, and said at least one prioritized application program including the preferred application program;
means for conducting an inquiry of the ad-hoc communications network to discover at least one nearby device in said at least one device, the inquiry including an indication that said at least one nearby device may include a middleware layer;
means for exchanging distributed application directory information with a nearby wireless device over the wireless ad-hoc communications network for providing a combined distributed application directory listing;
means for accessing the combined distributed application directory listing to identify the preferred application program in said at least one prioritized application program;
means for assigning a priority for the selected application based on the combined distributed applications directory, wherein the priority is calculated from a local application priority and corresponding application priority of the nearby device; and
means for accessing the local information database to examine in the combined distributed applications directory said at least one control parameter from the group comprising application states; user-defined application settings and macros, wherein the macros comprise (i) auto-download, (ii) downloadable, (iii) auto-launch-everything and (iv) transfer and state indications associated with the preferred application program.

53. A wireless device, comprising:
a memory device including at least one application program, operating system software, and a distributed application directory in a middleware layer;
said distributed applications directory listing each application that is resident in each device in an ad-hoc communications network;
a processor disposed in communication with the memory device for controlling access to an application program in the device, the processor configured to:
exchange distributed application directory information with a nearby wireless device over a wireless ad-hoc communications network for providing a combined distributed application directory listing;
choose a selected application from a list of application programs in the combined distributed applications directory;
assign a priority for the selected application based on the combined distributed applications directory, wherein the priority is calculated from a local application priority and corresponding application priority of the nearby device;
examine at least one control parameter from the group comprising application states; user-defined application settings and macros, wherein the macros comprise (i) auto-download, (ii) downloadable, (iii) auto-launch-everything and (iv) transfer and state indications in the combined distributed applications directory associated with the selected prioritized application; and
launch the selected prioritized application to enable the wireless device and the nearby wireless device to communicate via the selected prioritized application.

54. The wireless device of claim 53 further comprising:
an application program interface included in the memory for assisting the wireless device to find and communicate with a counter part application running on a nearby wireless device.

55. The wireless device of claim 53 further comprising:
a table located in the distributed application directory, the table including (i) a listing by device of applications resident in wireless devices in the ad-hoc communication network.

56. The wireless device of claim 55 further comprising:
(ii) an application identifier; (iii) a role for each application identified in the table.

57. The wireless device of claim 55 further comprising:
(iv) control parameters for each application identified in the table.

58. The wireless device of claim 57 wherein the control parameters are in categories including (i) application states, (ii) user-defined application settings and (iii) and macros or combinations of user-defined application settings.

59. The wireless device of claim 58 wherein the application states comprise (i) Installed, (ii) In-Machine, (iii) Running.

60. The wireless device of claim 58 wherein the application settings comprise (i) Wanted, (ii) Distributable, and (iii) Erase-After-Use.

61. The wireless device of claim 58 wherein the macros comprise (i) Auto-Download, (ii) Downloadable, (iii) Auto-Launch-Everything, and (iv) Transfer and State Indications.

62. A computer readable medium encoded with a computer program for launching an application runnable in a wireless device and a nearby device connected to an ad-hoc communication network and enabling the wireless device to communicate with the nearby device via the application and perform the following method:
   at start, determining if an application to be launched is in the wireless device;
   if not, copy and install permanently or temporarily in the wireless device, the application;
   from the nearby device and return to start;
   determining if the application is in the nearby wireless device;
   if not, copy the application from the wireless device to the nearby wireless device, and return to start;
   determining if the application running in the nearby device;
   if yes, let the wireless device and the nearby wireless device communicate via the application until terminated and return to start;
   if not, determine if the application is running in the wireless device;
   if yes, return to start, and
   if not, start the application in the wireless device and return to start.

63. A system, comprising:
   a memory device including a distributed application directory in a middleware layer, the directory listing all applications resident in each wireless device in an ad-hoc network; and
   a processor disposed in communication with the memory device for controlling access to an application program in the device, the processor configured to:
   choose a selected application from a list of application programs in the distributed applications directory;
   assign a priority for the selected application based on the combined distributed applications directory, wherein the priority is calculated from a local application priority and corresponding application priority of the nearby device;
   examine at least one control parameter from the group comprising application states; user-defined application settings and macros, wherein the macros comprise (i) auto-download, (ii) downloadable, (iii) auto-launch-everything and (iv) transfer and state indications associated with the selected application; and
   determine a behavior for the selected application based on the assigned priority and the at least one control parameter.

* * * * *